United States Patent
Marty et al.

(10) Patent No.: US 8,469,056 B2
(45) Date of Patent: Jun. 25, 2013

(54) MIXING VALVE INCLUDING A MOLDED WATERWAY ASSEMBLY

(75) Inventors: Garry Robin Marty, Fishers, IN (US); Kyle Robert Davidson, Fishers, IN (US); Steven Kyle Meehan, Fishers, IN (US); Darrell Scott Crowe, Lebanon, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 345 days.

(21) Appl. No.: 12/897,371

(22) Filed: Oct. 4, 2010

(65) Prior Publication Data

US 2011/0016625 A1    Jan. 27, 2011

Related U.S. Application Data

(62) Division of application No. 11/700,598, filed on Jan. 31, 2007, now Pat. No. 7,806,141.

(51) Int. Cl.
*E03C 1/05* (2006.01)
*F16K 21/00* (2006.01)

(52) U.S. Cl.
USPC ............. 137/625.4; 137/801; 251/129.04; 4/623

(58) Field of Classification Search
USPC ... 137/801, 625.41, 625.4; 251/129.04; 4/623
See application file for complete search history.

(56) References Cited

U.S. PATENT DOCUMENTS

| | | |
|---|---|---|
| 2,200,091 A | 5/1940 | Kovach |
| 2,219,471 A | 10/1940 | Davis |
| 2,546,327 A | 3/1951 | Young |
| 2,548,933 A | 4/1951 | Barnett |
| 2,781,786 A | 2/1957 | Young |
| 2,884,007 A | 4/1959 | Green |
| 2,991,481 A | 7/1961 | Book |
| 3,081,594 A | 3/1963 | Atkins et al. |
| 3,151,340 A | 10/1964 | Teshima |
| 3,229,710 A | 1/1966 | Keller, III |
| 3,254,313 A | 5/1966 | Atkins et al. |
| 3,314,081 A | 4/1967 | Atkins et al. |
| 3,333,160 A | 7/1967 | Gorski |
| 3,406,941 A | 10/1968 | Ichimori et al. |
| 3,422,849 A | 1/1969 | Manoogian |
| 3,448,768 A | 6/1969 | Keller, III |
| 3,505,098 A | 4/1970 | Miller et al. |
| 3,520,325 A | 7/1970 | Stuart |

(Continued)

FOREIGN PATENT DOCUMENTS

| | | |
|---|---|---|
| CA | 2492226 A1 | 7/2005 |
| DE | 3339849 | 5/1985 |

(Continued)

OTHER PUBLICATIONS

Camacho et al., Freescale Semiconductor, "Touch Pad System Using MC34940/MC33794 E-Field Sensors," Feb. 2006, 52 pgs.

(Continued)

*Primary Examiner* — Kevin Lee
(74) *Attorney, Agent, or Firm* — Faegre Baker Daniels LLP

(57) ABSTRACT

A fluid delivery device including a valve body fluidly coupled to an electrically insulating waterway assembly. The waterway assembly may include a molded base, and a capacitive sensor may be electrically coupled to the valve body.

31 Claims, 13 Drawing Sheets

U.S. PATENT DOCUMENTS

| | | |
|---|---|---|
| 3,580,289 A | 5/1971 | James et al. |
| 3,588,038 A | 6/1971 | Tanaka |
| 3,590,876 A | 7/1971 | Young |
| 3,600,723 A | 8/1971 | Mongerson et al. |
| 3,651,989 A | 3/1972 | Westrich |
| 3,685,541 A | 8/1972 | Braucksick et al. |
| 3,705,574 A | 12/1972 | Duncan |
| 3,714,958 A | 2/1973 | Johnson et al. |
| 3,757,824 A | 9/1973 | Parkhurst et al. |
| 3,765,455 A | 10/1973 | Countryman |
| 3,770,004 A | 11/1973 | Johnson et al. |
| 3,796,380 A | 3/1974 | Johnson et al. |
| 3,799,171 A | 3/1974 | Patel |
| 3,807,453 A | 4/1974 | Dom et al. |
| 3,854,493 A | 12/1974 | Farrell |
| 3,965,936 A | 6/1976 | Lyon |
| 3,987,819 A | 10/1976 | Scheuermann |
| 3,989,787 A | 11/1976 | Scott, Jr. et al. |
| 3,998,240 A | 12/1976 | Liautaud |
| 4,026,328 A | 5/1977 | Nelson |
| 4,076,279 A | 2/1978 | Klotz et al. |
| 4,103,709 A | 8/1978 | Fischer |
| 4,130,136 A | 12/1978 | Garnier et al. |
| 4,185,336 A | 1/1980 | Young |
| 4,201,518 A | 5/1980 | Stevenson |
| 4,221,338 A | 9/1980 | Shames et al. |
| 4,290,052 A | 9/1981 | Eichelberger et al. |
| 4,295,132 A | 10/1981 | Burney et al. |
| 4,316,870 A | 2/1982 | Rowley |
| 4,331,292 A | 5/1982 | Zimmer |
| 4,337,388 A | 6/1982 | July |
| 4,337,795 A | 7/1982 | Argyris et al. |
| 4,356,574 A | 11/1982 | Johnson |
| 4,357,957 A | 11/1982 | Bisonaya et al. |
| 4,359,186 A | 11/1982 | Kiendl |
| 4,387,738 A | 6/1983 | Bisonaya et al. |
| 4,397,330 A | 8/1983 | Hayman |
| 4,406,313 A | 9/1983 | Bennett et al. |
| 4,407,444 A | 10/1983 | Knebel et al. |
| 4,409,694 A | 10/1983 | Barrett et al. |
| 4,410,791 A | 10/1983 | Eastep |
| 4,415,389 A | 11/1983 | Medford et al. |
| 4,420,811 A | 12/1983 | Tarnay et al. |
| 4,421,269 A | 12/1983 | Ts'ao |
| 4,424,767 A | 1/1984 | Wicke et al. |
| 4,429,422 A | 2/1984 | Wareham |
| 4,436,983 A | 3/1984 | Solobay |
| 4,439,669 A | 3/1984 | Ryffel |
| 4,446,084 A | 5/1984 | Rowley |
| 4,450,829 A | 5/1984 | Morita et al. |
| 4,453,567 A | 6/1984 | MacDonald |
| 4,458,839 A | 7/1984 | MacDonald |
| 4,459,465 A | 7/1984 | Knight |
| 4,484,600 A | 11/1984 | Peterson et al. |
| 4,502,507 A | 3/1985 | Hayman |
| 4,503,575 A | 3/1985 | Knoop et al. |
| 4,513,769 A | 4/1985 | Purcell |
| 4,525,136 A | 6/1985 | Rowley |
| 4,537,348 A | 8/1985 | Gossi |
| 4,541,562 A | 9/1985 | Zukausky |
| 4,552,171 A | 11/1985 | Farrell et al. |
| 4,554,688 A | 11/1985 | Puccerella |
| 4,563,780 A | 1/1986 | Pollack |
| 4,567,350 A | 1/1986 | Todd, Jr. |
| 4,577,835 A | 3/1986 | Holycross et al. |
| 4,580,601 A | 4/1986 | Schlotman et al. |
| 4,581,707 A | 4/1986 | Millar |
| 4,584,463 A | 4/1986 | Klages et al. |
| 4,592,388 A | 6/1986 | Wilcox |
| 4,604,515 A | 8/1986 | Davidson |
| 4,606,325 A | 8/1986 | Lujan |
| 4,607,659 A | 8/1986 | Cole |
| 4,610,429 A | 9/1986 | Arnold et al. |
| 4,611,757 A | 9/1986 | Saether |
| 4,626,005 A | 12/1986 | Stifter |
| 4,628,902 A | 12/1986 | Comber |
| 4,635,673 A | 1/1987 | Gerdes |
| 4,638,147 A | 1/1987 | Dytch et al. |
| 4,649,958 A | 3/1987 | Purcell |
| 4,652,263 A | 3/1987 | Herweck et al. |
| 4,664,423 A | 5/1987 | Rowley |
| 4,667,987 A | 5/1987 | Knebel |
| 4,671,316 A | 6/1987 | Botnick |
| 4,674,678 A | 6/1987 | Knebel et al. |
| 4,680,446 A | 7/1987 | Post |
| 4,682,581 A | 7/1987 | Laing et al. |
| 4,682,728 A | 7/1987 | Oudenhoven et al. |
| 4,687,025 A | 8/1987 | Kahle et al. |
| 4,688,277 A | 8/1987 | Kakinoki et al. |
| 4,700,884 A | 10/1987 | Barrett et al. |
| 4,700,885 A | 10/1987 | Knebel |
| 4,700,928 A | 10/1987 | Marty |
| 4,708,172 A | 11/1987 | Riis |
| 4,709,728 A | 12/1987 | Ying-Chung |
| 4,713,525 A | 12/1987 | Eastep |
| 4,716,605 A | 1/1988 | Shepherd et al. |
| 4,735,357 A | 4/1988 | Gregory et al. |
| 4,738,280 A | 4/1988 | Oberholtzer |
| 4,742,456 A | 5/1988 | Kamena |
| 4,749,003 A | 6/1988 | Leason |
| 4,750,472 A | 6/1988 | Fazekas |
| 4,753,265 A | 6/1988 | Barrett et al. |
| 4,754,993 A | 7/1988 | Kraynick |
| 4,756,030 A | 7/1988 | Juliver |
| 4,757,943 A | 7/1988 | Sperling et al. |
| 4,760,871 A | 8/1988 | Vijay |
| 4,761,839 A | 8/1988 | Ganaway |
| 4,762,143 A | 8/1988 | Botnick |
| 4,762,273 A | 8/1988 | Gregory et al. |
| 4,768,705 A | 9/1988 | Tsutsui et al. |
| 4,773,348 A | 9/1988 | Rowley |
| 4,783,303 A | 11/1988 | Imgram |
| 4,786,782 A | 11/1988 | Takai et al. |
| 4,798,224 A | 1/1989 | Haws |
| 4,803,033 A | 2/1989 | Rowley |
| 4,808,793 A | 2/1989 | Hurko |
| 4,832,259 A | 5/1989 | Vandermeyden |
| 4,838,304 A | 6/1989 | Knapp |
| 4,845,316 A | 7/1989 | Kaercher |
| 4,853,164 A | 8/1989 | Kiang et al. |
| 4,854,498 A | 8/1989 | Stayton |
| 4,869,287 A | 9/1989 | Pepper et al. |
| 4,869,427 A | 9/1989 | Kawamoto et al. |
| 4,870,986 A | 10/1989 | Barrett et al. |
| 4,872,485 A | 10/1989 | Laverty |
| 4,875,623 A | 10/1989 | Garris |
| 4,877,660 A | 10/1989 | Overbergh et al. |
| 4,887,642 A | 12/1989 | Bernat |
| 4,893,653 A | 1/1990 | Ferrigno |
| 4,896,658 A | 1/1990 | Yonekubo et al. |
| 4,901,915 A | 2/1990 | Sakakibara |
| 4,909,435 A | 3/1990 | Kidouchi et al. |
| 4,914,758 A | 4/1990 | Shaw |
| 4,916,613 A | 4/1990 | Lange et al. |
| 4,917,142 A | 4/1990 | Laing et al. |
| 4,921,211 A | 5/1990 | Novak et al. |
| 4,923,116 A | 5/1990 | Homan |
| 4,930,551 A | 6/1990 | Haws |
| 4,936,289 A | 6/1990 | Peterson |
| 4,941,608 A | 7/1990 | Shimizu et al. |
| 4,942,644 A | 7/1990 | Rowley |
| 4,945,942 A | 8/1990 | Lund |
| 4,945,943 A | 8/1990 | Cogger |
| 4,955,535 A | 9/1990 | Tsutsui et al. |
| 4,957,135 A | 9/1990 | Knapp |
| 4,965,894 A | 10/1990 | Baus |
| 4,967,794 A | 11/1990 | Tsutsui et al. |
| 4,969,598 A | 11/1990 | Garris |
| 4,970,373 A | 11/1990 | Lutz et al. |
| 4,971,106 A | 11/1990 | Tsutsui et al. |
| 4,971,112 A | 11/1990 | Knapp |
| 4,979,530 A | 12/1990 | Breda |
| 4,981,158 A | 1/1991 | Brondolino et al. |
| 4,985,944 A | 1/1991 | Shaw |
| 4,995,585 A | 2/1991 | Gruber et al. |
| 4,998,673 A | 3/1991 | Pilolla |
| 5,001,008 A | 3/1991 | Tokita et al. |

| | | | | | |
|---|---|---|---|---|---|
| 5,006,207 A | 4/1991 | Peterman et al. | 5,408,578 A | 4/1995 | Bolivar |
| 5,009,572 A | 4/1991 | Imhoff et al. | 5,417,242 A | 5/1995 | Goncze |
| 5,012,124 A | 4/1991 | Hollaway | 5,419,930 A | 5/1995 | Schucker |
| 5,020,127 A | 5/1991 | Eddas et al. | 5,429,272 A | 7/1995 | Luigi |
| 5,027,851 A | 7/1991 | Drees et al. | 5,437,003 A | 7/1995 | Blanco |
| 5,033,508 A | 7/1991 | Laverty | RE35,018 E | 8/1995 | Homan |
| 5,040,106 A | 8/1991 | Maag | 5,437,345 A | 8/1995 | Schmidt et al. |
| 5,042,524 A | 8/1991 | Lund | 5,438,642 A | 8/1995 | Posen |
| 5,053,097 A | 10/1991 | Johansson et al. | 5,467,967 A | 11/1995 | Gillooly |
| 5,056,712 A | 10/1991 | Enck | 5,479,558 A | 12/1995 | White et al. |
| 5,057,214 A | 10/1991 | Morris | 5,482,250 A | 1/1996 | Kodaira |
| 5,058,804 A | 10/1991 | Yonekubo et al. | 5,493,873 A | 2/1996 | Donselman et al. |
| 5,063,955 A | 11/1991 | Sakakibara | 5,494,259 A | 2/1996 | Peterson |
| 5,073,991 A | 12/1991 | Marty | 5,504,306 A | 4/1996 | Russell et al. |
| 5,074,520 A | 12/1991 | Lee et al. | 5,504,950 A | 4/1996 | Natalizia et al. |
| 5,086,526 A | 2/1992 | Van Marcke | 5,511,579 A | 4/1996 | Price |
| 5,090,062 A | 2/1992 | Hochstrasser | 5,511,723 A | 4/1996 | Eki et al. |
| 5,092,560 A | 3/1992 | Chen | 5,518,027 A | 5/1996 | Saiki et al. |
| 5,095,554 A | 3/1992 | Gloor | 5,527,503 A | 6/1996 | Rowley |
| 5,095,945 A | 3/1992 | Jensen | 5,540,555 A | 7/1996 | Corso et al. |
| 5,100,565 A | 3/1992 | Fujiwara et al. | 5,549,273 A | 8/1996 | Aharon |
| 5,105,846 A | 4/1992 | Britt | 5,550,753 A | 8/1996 | Tompkins et al. |
| 5,110,044 A | 5/1992 | Bergmann | 5,551,637 A | 9/1996 | Lo |
| 5,124,934 A | 6/1992 | Kawamoto et al. | 5,553,935 A | 9/1996 | Burnham et al. |
| 5,125,433 A | 6/1992 | DeMoss et al. | 5,555,912 A | 9/1996 | Saadi et al. |
| 5,127,814 A | 7/1992 | Johnson et al. | 5,558,128 A | 9/1996 | Pawelzik et al. |
| 5,129,034 A | 7/1992 | Sydenstricker | 5,564,462 A | 10/1996 | Storch |
| 5,131,428 A | 7/1992 | Bory | 5,566,702 A | 10/1996 | Philipp |
| 5,133,089 A | 7/1992 | Tsutsui et al. | 5,566,707 A | 10/1996 | Ching et al. |
| 5,139,044 A | 8/1992 | Otten et al. | 5,570,869 A | 11/1996 | Diaz et al. |
| 5,143,049 A | 9/1992 | Laing et al. | 5,572,985 A | 11/1996 | Benham |
| 5,148,824 A | 9/1992 | Wilson et al. | 5,573,037 A | 11/1996 | Cole et al. |
| 5,148,837 A | 9/1992 | Ågren et al. | 5,577,393 A | 11/1996 | Donselman et al. |
| 5,150,922 A | 9/1992 | Nakashiba et al. | 5,577,660 A | 11/1996 | Hansen |
| 5,170,361 A | 12/1992 | Reed | 5,579,808 A | 12/1996 | Mikol et al. |
| 5,170,514 A | 12/1992 | Weigert | 5,582,438 A | 12/1996 | Wilkins et al. |
| 5,170,816 A | 12/1992 | Schnieders | 5,584,316 A | 12/1996 | Lund |
| 5,170,944 A | 12/1992 | Shirai | 5,586,572 A | 12/1996 | Lund |
| 5,174,495 A | 12/1992 | Eichholz et al. | 5,586,746 A | 12/1996 | Humpert et al. |
| 5,175,892 A | 1/1993 | Shaw | 5,588,636 A | 12/1996 | Eichholz et al. |
| 5,183,029 A | 2/1993 | Ranger | 5,595,216 A | 1/1997 | Pilolla |
| 5,184,642 A | 2/1993 | Powell | 5,595,342 A | 1/1997 | McNair et al. |
| 5,187,816 A | 2/1993 | Chiou | 5,603,344 A | 2/1997 | Hall |
| 5,202,666 A | 4/1993 | Knippscheer | 5,609,370 A | 3/1997 | Szabo et al. |
| 5,205,318 A | 4/1993 | Massaro et al. | 5,610,589 A | 3/1997 | Evans et al. |
| 5,206,963 A | 5/1993 | Wiens | 5,611,093 A | 3/1997 | Barnum et al. |
| 5,217,035 A | 6/1993 | Van Marcke | 5,615,709 A | 4/1997 | Knapp |
| 5,219,185 A | 6/1993 | Oddenino | 5,622,203 A | 4/1997 | Givler et al. |
| 5,224,509 A | 7/1993 | Tanaka et al. | 5,622,210 A | 4/1997 | Crisman et al. |
| 5,224,685 A | 7/1993 | Chiang et al. | 5,622,670 A | 4/1997 | Rowley |
| 5,243,717 A | 9/1993 | Yasuo | 5,623,990 A | 4/1997 | Pirkle |
| D340,279 S | 10/1993 | Mattis | 5,627,375 A | 5/1997 | Hsieh |
| 5,257,341 A | 10/1993 | Austin et al. | 5,642,755 A | 7/1997 | Mark et al. |
| 5,261,443 A | 11/1993 | Walsh | 5,650,597 A | 7/1997 | Redmayne |
| 5,262,621 A | 11/1993 | Hu et al. | 5,651,384 A | 7/1997 | Rudrich |
| 5,265,318 A | 11/1993 | Shero | 5,655,749 A | 8/1997 | Mauerhofer |
| 5,277,219 A | 1/1994 | Lund | 5,660,692 A | 8/1997 | Nesburn et al. |
| 5,279,333 A | 1/1994 | Lawrence | 5,669,407 A | 9/1997 | Bailey |
| 5,281,808 A | 1/1994 | Kunkel | 5,669,417 A | 9/1997 | Lian-Jie |
| 5,287,570 A | 2/1994 | Peterson et al. | 5,669,595 A | 9/1997 | Bytheway |
| 5,309,940 A | 5/1994 | Delabie et al. | 5,682,032 A | 10/1997 | Philipp |
| 5,315,719 A | 5/1994 | Tsutsui et al. | 5,685,341 A | 11/1997 | Chrysler et al. |
| 5,322,086 A | 6/1994 | Sullivan | 5,687,952 A | 11/1997 | Arnold et al. |
| 5,323,803 A | 6/1994 | Blumenauer | 5,694,653 A | 12/1997 | Harald |
| 5,325,822 A | 7/1994 | Fernandez | 5,695,094 A | 12/1997 | Burnham et al. |
| 5,334,819 A | 8/1994 | Lin | 5,725,008 A | 3/1998 | Johnson |
| 5,340,018 A | 8/1994 | MacDonald et al. | 5,729,422 A | 3/1998 | Henke |
| 5,341,839 A | 8/1994 | Kobayashi et al. | 5,730,165 A | 3/1998 | Philipp |
| 5,351,347 A | 10/1994 | Kunkel | 5,730,173 A | 3/1998 | Sponheimer |
| 5,351,712 A | 10/1994 | Houlihan | 5,735,291 A | 4/1998 | Kaonohi |
| 5,358,177 A | 10/1994 | Cashmore | 5,741,458 A | 4/1998 | Rowley |
| 5,361,215 A | 11/1994 | Tompkins et al. | 5,743,511 A | 4/1998 | Eichholz et al. |
| 5,362,026 A | 11/1994 | Kobayashi et al. | 5,746,244 A | 5/1998 | Woolley, Sr. et al. |
| 5,366,253 A | 11/1994 | Nakashiba et al. | 5,755,262 A | 5/1998 | Pilolla |
| 5,375,889 A | 12/1994 | Nakashiba et al. | 5,756,023 A | 5/1998 | Stachowiak |
| 5,385,168 A | 1/1995 | Lund | 5,758,688 A | 6/1998 | Hamanaka et al. |
| 5,397,099 A | 3/1995 | Pilolla | 5,758,690 A | 6/1998 | Humpert et al. |
| 5,397,102 A | 3/1995 | Kingman | 5,769,120 A | 6/1998 | Laverty et al. |
| 5,400,961 A | 3/1995 | Tsutsui et al. | 5,771,501 A | 6/1998 | Shaw |

| | | | | | | |
|---|---|---|---|---|---|---|
| 5,775,372 A | 7/1998 | Houlihan | | 6,138,296 A | 10/2000 | Baker |
| 5,775,587 A | 7/1998 | Davis | | 6,155,297 A | 12/2000 | MacAusland et al. |
| 5,784,531 A | 7/1998 | Mann et al. | | 6,161,230 A | 12/2000 | Pitsch |
| 5,790,024 A | 8/1998 | Ripingill et al. | | 6,167,845 B1 | 1/2001 | Decker, Sr. |
| 5,803,120 A | 9/1998 | Bertoli | | 6,170,098 B1 | 1/2001 | Pitsch |
| 5,812,059 A | 9/1998 | Shaw et al. | | 6,175,689 B1 | 1/2001 | Blanco, Jr. |
| 5,813,435 A | 9/1998 | Knapp | | 6,177,516 B1 | 1/2001 | Hudak |
| 5,813,655 A | 9/1998 | Pinchott et al. | | 6,182,683 B1 | 2/2001 | Sisk |
| 5,819,366 A | 10/1998 | Edin | | 6,192,192 B1 | 2/2001 | Illy et al. |
| 5,829,467 A | 11/1998 | Spicher | | 6,195,588 B1 | 2/2001 | Gauthier et al. |
| 5,829,475 A | 11/1998 | Acker | | 6,202,686 B1 | 3/2001 | Pitsch et al. |
| 5,833,279 A | 11/1998 | Rowley | | 6,202,980 B1 | 3/2001 | Vincent et al. |
| 5,845,844 A | 12/1998 | Zosimodis | | 6,220,297 B1 | 4/2001 | Marty et al. |
| 5,850,855 A | 12/1998 | Kerschbaumer et al. | | 6,227,235 B1 | 5/2001 | Laing et al. |
| 5,857,489 A | 1/1999 | Chang | | 6,227,464 B1 | 5/2001 | Allmendinger et al. |
| 5,857,717 A | 1/1999 | Caffrey | | 6,238,575 B1 | 5/2001 | Patil |
| 5,861,200 A | 1/1999 | Rowley | | 6,240,250 B1 | 5/2001 | Blanco, Jr. |
| 5,865,473 A | 2/1999 | Semchuchk et al. | | 6,250,558 B1 | 6/2001 | Cuevas |
| 5,868,311 A | 2/1999 | Cretu-Petra | | 6,250,601 B1 | 6/2001 | Kolar et al. |
| 5,872,891 A | 2/1999 | Son | | 6,256,810 B1 | 7/2001 | Baker |
| 5,875,809 A | 3/1999 | Barrom | | 6,270,125 B1 | 8/2001 | Rowley et al. |
| 5,893,387 A | 4/1999 | Paterson et al. | | 6,273,394 B1 | 8/2001 | Vincent et al. |
| 5,895,695 A | 4/1999 | Rowley | | 6,283,139 B1 | 9/2001 | Symonds et al. |
| 5,915,417 A | 6/1999 | Diaz et al. | | 6,286,764 B1 | 9/2001 | Garvey et al. |
| 5,916,647 A | 6/1999 | Weinstein | | 6,286,808 B1 | 9/2001 | Slothower et al. |
| 5,918,855 A | 7/1999 | Hamanaka et al. | | 6,287,501 B1 | 9/2001 | Rowley |
| 5,924,451 A | 7/1999 | Kuo | | 6,288,707 B1 | 9/2001 | Philipp |
| 5,927,333 A | 7/1999 | Grassberger | | 6,290,139 B1 | 9/2001 | Kolze |
| 5,934,325 A | 8/1999 | Brattoli et al. | | 6,293,336 B1 | 9/2001 | Emerick, Sr. et al. |
| 5,937,892 A | 8/1999 | Meisner et al. | | 6,294,786 B1 | 9/2001 | Marcichow et al. |
| 5,941,275 A | 8/1999 | Laing | | 6,296,017 B2 | 10/2001 | Kimizuka |
| 5,941,504 A | 8/1999 | Toma et al. | | 6,305,407 B1 | 10/2001 | Selby |
| 5,943,713 A | 8/1999 | Paterson et al. | | 6,315,208 B1 | 11/2001 | Doyle |
| 5,944,221 A | 8/1999 | Laing et al. | | 6,315,715 B1 | 11/2001 | Taylor et al. |
| 5,944,225 A | 8/1999 | Kawolics | | 6,317,717 B1 | 11/2001 | Lindsey et al. |
| 5,950,663 A | 9/1999 | Bloomfield | | 6,321,785 B1 | 11/2001 | Bergmann |
| 5,960,490 A | 10/1999 | Pitsch | | 6,328,059 B1 | 12/2001 | Testori et al. |
| 5,961,095 A | 10/1999 | Schrott | | 6,334,466 B1 | 1/2002 | Jani et al. |
| 5,963,624 A | 10/1999 | Pope | | 6,337,635 B1 | 1/2002 | Ericksen et al. |
| 5,965,077 A | 10/1999 | Rowley et al. | | 6,340,032 B1 | 1/2002 | Zosimadis |
| 5,966,753 A | 10/1999 | Gauthier et al. | | 6,341,389 B2 | 1/2002 | Philipps-Liebich et al. |
| 5,973,417 A | 10/1999 | Goetz et al. | | 6,341,617 B1 | 1/2002 | Wilson |
| 5,975,143 A | 11/1999 | Järvenkylä et al. | | 6,349,733 B1 | 2/2002 | Smith |
| 5,979,489 A | 11/1999 | Pitsch | | 6,351,603 B2 | 2/2002 | Waithe et al. |
| 5,979,776 A | 11/1999 | Williams | | 6,363,549 B2 | 4/2002 | Humpert |
| 5,983,922 A | 11/1999 | Laing et al. | | 6,373,265 B1 | 4/2002 | Morimoto et al. |
| 5,988,593 A | 11/1999 | Rice | | 6,377,009 B1 | 4/2002 | Philipp |
| 6,000,170 A | 12/1999 | Davis | | 6,378,790 B1 | 4/2002 | Paterson et al. |
| 6,003,170 A | 12/1999 | Humpert et al. | | 6,381,770 B1 | 5/2002 | Raisch |
| 6,003,182 A | 12/1999 | Song | | 6,385,794 B1 | 5/2002 | Miedzius et al. |
| 6,006,784 A | 12/1999 | Tsutsui et al. | | 6,389,226 B1 | 5/2002 | Neale et al. |
| 6,013,382 A | 1/2000 | Coltrinari et al. | | 6,438,770 B1 | 8/2002 | Hed et al. |
| 6,019,130 A | 2/2000 | Rump | | 6,439,581 B1 | 8/2002 | Chang |
| 6,023,796 A | 2/2000 | Pitsch | | 6,445,306 B1 | 9/2002 | Trovato et al. |
| 6,026,844 A | 2/2000 | Laing et al. | | 6,446,875 B1 | 9/2002 | Brooks et al. |
| 6,029,094 A | 2/2000 | Diffut | | 6,452,514 B1 | 9/2002 | Philipp |
| 6,029,860 A | 2/2000 | Donselman et al. | | RE37,888 E | 10/2002 | Cretu-Petra |
| 6,029,948 A | 2/2000 | Shafer | | 6,457,355 B1 | 10/2002 | Philipp |
| 6,032,616 A | 3/2000 | Jones | | 6,464,266 B1 | 10/2002 | O'Neill et al. |
| 6,042,885 A | 3/2000 | Woollard et al. | | 6,466,036 B1 | 10/2002 | Philipp |
| 6,044,859 A | 4/2000 | Davis | | 6,473,917 B1 | 11/2002 | Mateina |
| 6,053,214 A | 4/2000 | Sjoberg et al. | | 6,474,951 B2 | 11/2002 | Stephan et al. |
| 6,059,192 A | 5/2000 | Zosimadis | | 6,485,666 B1 | 11/2002 | Rowley |
| 6,061,499 A | 5/2000 | Hlebovy | | 6,513,787 B1 | 2/2003 | Jeromson et al. |
| 6,062,251 A | 5/2000 | Pitch | | 6,522,078 B1 | 2/2003 | Okamoto et al. |
| 6,070,614 A | 6/2000 | Holzheimer et al. | | 6,535,134 B2 | 3/2003 | Lang et al. |
| 6,070,916 A | 6/2000 | Rowley | | 6,535,200 B2 | 3/2003 | Philipp |
| 6,073,972 A | 6/2000 | Rivera | | 6,536,464 B1 | 3/2003 | Lum et al. |
| 6,075,454 A | 6/2000 | Yamasaki | | 6,547,966 B2 * | 4/2003 | Allmendinger et al. . 210/497.01 |
| 6,079,447 A | 6/2000 | Holzheimer et al. | | 6,549,816 B2 | 4/2003 | Gauthier et al. |
| 6,082,407 A | 7/2000 | Paterson et al. | | 6,557,907 B2 | 5/2003 | Rowley |
| 6,082,780 A | 7/2000 | Rowley et al. | | 6,574,426 B1 | 6/2003 | Blanco, Jr. |
| 6,085,784 A | 7/2000 | Bloom et al. | | 6,588,377 B1 | 7/2003 | Leary et al. |
| 6,101,452 A | 8/2000 | Krall et al. | | 6,588,453 B2 | 7/2003 | Marty et al. |
| 6,116,884 A | 9/2000 | Rowley et al. | | 6,609,732 B1 | 8/2003 | Souvatzidis et al. |
| 6,123,232 A | 9/2000 | Donselman et al. | | 6,612,267 B1 | 9/2003 | West |
| 6,125,482 A | 10/2000 | Foster | | 6,619,320 B2 | 9/2003 | Parsons |
| 6,131,600 A | 10/2000 | Chang | | 6,622,930 B2 | 9/2003 | Laing et al. |
| 6,132,085 A | 10/2000 | Bergeron | | 6,629,645 B2 | 10/2003 | Mountford et al. |

| | | | | | | |
|---|---|---|---|---|---|---|
| 6,635,334 B1 | 10/2003 | Jackson et al. | | 7,766,026 B2 | 8/2010 | Boey |
| 6,639,209 B1 | 10/2003 | Patterson et al. | | 7,784,481 B2 | 8/2010 | Kunkel |
| 6,640,357 B1 | 11/2003 | Chang | | 2001/0011389 A1 | 8/2001 | Philipps-Liebich et al. |
| 6,644,333 B2 | 11/2003 | Gloodt | | 2001/0011390 A1 | 8/2001 | Humpert et al. |
| 6,659,048 B1 | 12/2003 | DeSantis et al. | | 2001/0011558 A1 | 8/2001 | Schumacher |
| 6,676,024 B1 | 1/2004 | McNerney et al. | | 2001/0011560 A1 | 8/2001 | Pawelzik et al. |
| 6,684,822 B1 | 2/2004 | Lieggi | | 2001/0022352 A1 | 9/2001 | Rudrich |
| 6,691,338 B2 | 2/2004 | Zieger | | 2002/0007510 A1 | 1/2002 | Mann |
| 6,705,534 B1 | 3/2004 | Mueller | | 2002/0015024 A1 | 2/2002 | Westerman et al. |
| 6,707,030 B1 | 3/2004 | Watson | | 2002/0100139 A1 | 8/2002 | Rowley |
| 6,732,543 B2 | 5/2004 | Jenkins, Jr. et al. | | 2002/0100510 A1 | 8/2002 | Otelli |
| 6,734,685 B2 | 5/2004 | Rudrich | | 2002/0113134 A1 | 8/2002 | Laing et al. |
| 6,738,996 B1 | 5/2004 | Malek et al. | | 2002/0117122 A1 | 8/2002 | Lindner |
| 6,757,921 B2 | 7/2004 | Esche | | 2002/0148040 A1 | 10/2002 | Mateina |
| 6,768,103 B2 | 7/2004 | Watson | | 2002/0167171 A1 | 11/2002 | Becker et al. |
| 6,770,376 B2 | 8/2004 | Chen | | 2002/0175789 A1 | 11/2002 | Pimouguet |
| 6,770,384 B2 | 8/2004 | Chen | | 2002/0179723 A1 | 12/2002 | Wack et al. |
| 6,770,869 B2 | 8/2004 | Patterson et al. | | 2003/0041374 A1 | 3/2003 | Franke |
| 6,779,552 B1 | 8/2004 | Coffman | | 2003/0080194 A1 | 5/2003 | O'Hara et al. |
| 6,783,160 B2 | 8/2004 | Rowley | | 2003/0088338 A1 | 5/2003 | Phillips et al. |
| 6,803,133 B2 | 10/2004 | Chen | | 2003/0089399 A1 | 5/2003 | Acker |
| 6,817,379 B2 | 11/2004 | Perla | | 2003/0125842 A1 | 7/2003 | Chang et al. |
| 6,835,777 B2 | 12/2004 | Botros | | 2003/0126993 A1 | 7/2003 | Lassota et al. |
| 6,838,041 B2 | 1/2005 | Rowley | | 2003/0183286 A1 | 10/2003 | Yang |
| 6,838,887 B2 | 1/2005 | Denen et al. | | 2003/0185548 A1 | 10/2003 | Novotny et al. |
| 6,845,526 B2 | 1/2005 | Malek et al. | | 2003/0201018 A1 | 10/2003 | Bush |
| 6,848,719 B2 | 2/2005 | Rowley | | 2003/0213062 A1 | 11/2003 | Honda et al. |
| 6,860,523 B2 | 3/2005 | O'Neill et al. | | 2003/0234769 A1 | 12/2003 | Cross et al. |
| 6,860,524 B1 | 3/2005 | Rowley | | 2004/0007278 A1 | 1/2004 | Williams |
| 6,877,172 B2 | 4/2005 | Malek et al. | | 2004/0011399 A1 | 1/2004 | Segien, Jr. |
| 6,892,952 B2 | 5/2005 | Chang et al. | | 2004/0021120 A1 | 2/2004 | Turnau, III et al. |
| 6,894,115 B2 | 5/2005 | Botros | | 2004/0041033 A1 | 3/2004 | Kemp |
| 6,895,985 B2 | 5/2005 | Popper et al. | | 2004/0041034 A1 | 3/2004 | Kemp |
| 6,902,210 B1 | 6/2005 | Rowley | | 2004/0041110 A1 | 3/2004 | Kaneko |
| 6,913,203 B2 | 7/2005 | DeLangis | | 2004/0060608 A1 | 4/2004 | Angus |
| 6,920,899 B2 | 7/2005 | Haenlein et al. | | 2004/0061685 A1 | 4/2004 | Ostergard et al. |
| 6,955,333 B2 | 10/2005 | Patterson et al. | | 2004/0088786 A1 | 5/2004 | Malek et al. |
| 6,956,498 B1 | 10/2005 | Gauthier et al. | | 2004/0117906 A1 | 6/2004 | Baker et al. |
| 6,959,736 B2 | 11/2005 | Järvenkylä | | 2004/0135010 A1 | 7/2004 | Malek et al. |
| 6,962,162 B2 | 11/2005 | Acker | | 2004/0143898 A1 | 7/2004 | Jost et al. |
| 6,962,168 B2 | 11/2005 | McDaniel et al. | | 2004/0144866 A1 | 7/2004 | Nelson et al. |
| 6,964,404 B2 | 11/2005 | Patterson et al. | | 2004/0149643 A1 | 8/2004 | Vandenbelt et al. |
| 6,964,405 B2 | 11/2005 | Marcichow et al. | | 2004/0150132 A1 | 8/2004 | Rowley |
| 6,968,860 B1 | 11/2005 | Haenlein et al. | | 2004/0155116 A1 | 8/2004 | Wack et al. |
| 6,978,795 B2 | 12/2005 | Perrin | | 2004/0176503 A1 | 9/2004 | Czayka et al. |
| 6,993,607 B2 | 1/2006 | Philipp | | 2004/0206405 A1 | 10/2004 | Smith et al. |
| 6,995,670 B2 | 2/2006 | Wadlow et al. | | 2004/0212599 A1 | 10/2004 | Cok et al. |
| 6,998,545 B2 | 2/2006 | Harkcom et al. | | 2004/0262552 A1 | 12/2004 | Lowe |
| 7,006,078 B2 | 2/2006 | Kim | | 2005/0001046 A1 | 1/2005 | Laing |
| 7,014,166 B1 | 3/2006 | Wang | | 2005/0005989 A1 | 1/2005 | Roloff |
| 7,015,704 B1 | 3/2006 | Lang | | 2005/0006402 A1 | 1/2005 | Acker |
| 7,025,077 B2 | 4/2006 | Vogel | | 2005/0022871 A1 | 2/2005 | Acker |
| 7,030,860 B1 | 4/2006 | Hsu et al. | | 2005/0044625 A1 | 3/2005 | Kommers |
| 7,063,105 B1 | 6/2006 | Chen | | 2005/0086958 A1 | 4/2005 | Walsh |
| 7,069,357 B2 | 6/2006 | Marx et al. | | 2005/0117912 A1 | 6/2005 | Patterson et al. |
| 7,069,941 B2 | 7/2006 | Parsons et al. | | 2005/0121529 A1 | 6/2005 | DeLangis |
| 7,083,156 B2 | 8/2006 | Jost et al. | | 2005/0125083 A1 | 6/2005 | Kiko |
| 7,096,517 B2 | 8/2006 | Gubeli et al. | | 2005/0127313 A1 | 6/2005 | Watson |
| 7,099,649 B2 | 8/2006 | Patterson et al. | | 2005/0146513 A1 | 7/2005 | Hill et al. |
| D528,991 S | 9/2006 | Katsuyama | | 2005/0150552 A1 | 7/2005 | Forshey |
| 7,102,366 B2 | 9/2006 | Denen et al. | | 2005/0150556 A1 | 7/2005 | Jonte |
| 7,107,631 B2 | 9/2006 | Lang et al. | | 2005/0150557 A1 | 7/2005 | McDaniel et al. |
| 7,111,640 B2 | 9/2006 | Rhodes | | 2005/0151101 A1 | 7/2005 | McDaniel et al. |
| 7,118,138 B1 | 10/2006 | Rowley et al. | | 2005/0194051 A1 | 9/2005 | Pinette |
| 7,134,452 B2 | 11/2006 | Hiroshi et al. | | 2005/0194399 A1 | 9/2005 | Proctor |
| 7,150,293 B2 | 12/2006 | Jonte | | 2005/0199841 A1 | 9/2005 | O'Maley |
| 7,174,577 B2 | 2/2007 | Jost et al. | | 2005/0199843 A1 | 9/2005 | Jost et al. |
| 7,174,579 B1 | 2/2007 | Bauza | | 2005/0205818 A1 | 9/2005 | Bayley et al. |
| 7,225,828 B2 | 6/2007 | Giagni et al. | | 2005/0253102 A1 | 11/2005 | Boilen et al. |
| 7,231,936 B2 | 6/2007 | Chang | | 2005/0273218 A1 | 12/2005 | Breed et al. |
| 7,232,111 B2 | 6/2007 | McDaniel | | 2006/0066991 A1 | 3/2006 | Hirano et al. |
| 7,278,624 B2 | 10/2007 | Iott et al. | | 2006/0101575 A1 | 5/2006 | Louis |
| 7,307,485 B1 | 12/2007 | Snyder et al. | | 2006/0108705 A1 | 5/2006 | Rowley |
| 7,415,991 B2 | 8/2008 | Meehan et al. | | 2006/0118185 A1 | 6/2006 | Nobili |
| 7,537,023 B2 | 5/2009 | Marty et al. | | 2006/0124183 A1 | 6/2006 | Kuo |
| 7,537,195 B2 | 5/2009 | McDaniel | | 2006/0130907 A1 | 6/2006 | Marty et al. |
| 7,690,395 B2 | 4/2010 | Jonte et al. | | 2006/0130908 A1 | 6/2006 | Marty et al. |
| 7,717,133 B2 | 5/2010 | Pinette et al. | | 2006/0138246 A1 | 6/2006 | Stowe et al. |
| 7,748,409 B2 | 7/2010 | Pinette et al. | | 2006/0145111 A1 | 7/2006 | Lang et al. |

| | | | |
|---|---|---|---|
| 2006/0153165 A1 | 7/2006 | Beachy |
| 2006/0170134 A1 | 8/2006 | Rowley et al. |
| 2006/0174955 A1 | 8/2006 | Huang |
| 2006/0186215 A1 | 8/2006 | Logan |
| 2006/0200903 A1 | 9/2006 | Rodenbeck et al. |
| 2006/0201558 A1 | 9/2006 | Marty et al. |
| 2006/0202142 A1 | 9/2006 | Marty et al. |
| 2006/0207019 A1 | 9/2006 | Vincent |
| 2006/0212016 A1 | 9/2006 | Lavon et al. |
| 2006/0214016 A1 | 9/2006 | Erdely et al. |
| 2006/0231638 A1 | 10/2006 | Belz et al. |
| 2006/0231782 A1 | 10/2006 | Iott et al. |
| 2006/0231788 A1 | 10/2006 | Cheng |
| 2006/0237674 A1 | 10/2006 | Iott et al. |
| 2006/0283511 A1 | 12/2006 | Nelson |
| 2007/0001018 A1 | 1/2007 | Schmitt et al. |
| 2007/0044852 A1 | 3/2007 | Pinette |
| 2007/0057215 A1 | 3/2007 | Parsons et al. |
| 2007/0069168 A1 | 3/2007 | Jonte |
| 2007/0069169 A1 | 3/2007 | Lin |
| 2007/0114073 A1 | 5/2007 | Akel et al. |
| 2007/0137714 A1 | 6/2007 | Meehan et al. |
| 2007/0137718 A1 | 6/2007 | Rushlander et al. |
| 2007/0138421 A1 | 6/2007 | Gibson et al. |
| 2007/0156260 A1 | 7/2007 | Rodenbeck et al. |
| 2007/0157978 A1 | 7/2007 | Jonte |
| 2007/0187635 A1 | 8/2007 | Jost |
| 2007/0246267 A1 | 10/2007 | Koottungal |
| 2007/0246550 A1 | 10/2007 | Rodenbeck et al. |
| 2007/0246564 A1 | 10/2007 | Rodenbeck et al. |
| 2007/0271695 A1 | 11/2007 | Thomas et al. |
| 2008/0078019 A1 | 4/2008 | Allen et al. |
| 2008/0099088 A1 | 5/2008 | Boey |
| 2008/0109956 A1 | 5/2008 | Bayley et al. |
| 2008/0178950 A1 | 7/2008 | Marty et al. |
| 2008/0271238 A1 | 11/2008 | Reeder et al. |
| 2008/0289098 A1 | 11/2008 | Kunkel |
| 2009/0039176 A1 | 2/2009 | Davidson et al. |
| 2009/0160659 A1 | 6/2009 | Bailey |
| 2009/0293192 A1 | 12/2009 | Pons |
| 2010/0012194 A1 | 1/2010 | Jonte et al. |
| 2010/0044604 A1 | 2/2010 | Burke et al. |
| 2010/0096017 A1 | 4/2010 | Jonte et al. |
| 2010/0108165 A1 | 5/2010 | Rodenbeck et al. |
| 2010/0170570 A1 | 7/2010 | Rodenbeck et al. |

FOREIGN PATENT DOCUMENTS

| | | |
|---|---|---|
| DE | 04401637 | 5/1998 |
| DE | 19815324 | 11/2000 |
| DE | 10133041 | 1/2003 |
| EP | 0 632 220 | 1/1995 |
| EP | 0 808 952 | 11/1997 |
| EP | 0961067 B1 | 12/1999 |
| EP | 1 134 895 | 9/2001 |
| JP | 3094877 | 4/1991 |
| JP | 63111383 | 5/1998 |
| JP | 200073426 | 3/2000 |
| JP | 200132343 | 6/2001 |
| JP | 2003-20703 A | 1/2003 |
| JP | 2003105817 | 4/2003 |
| JP | 2003293411 | 10/2003 |
| JP | 2004-92023 | 3/2004 |
| JP | 2005-146551 A | 6/2005 |
| KR | 10-1997-0700266 | 1/1997 |
| KR | 2003-0077823 | 10/2003 |
| KR | 20-0382786 Y1 | 4/2005 |
| WO | WO 91/05191 | 4/1991 |
| WO | WO 91/17377 | 11/1991 |
| WO | WO 96 14477 | 5/1996 |
| WO | WO 00/61831 | 10/2000 |
| WO | WO 01/20204 | 3/2001 |
| WO | WO 02/25022 | 3/2002 |
| WO | WO2004/094990 | 11/2004 |
| WO | WO 2005/057086 | 6/2005 |
| WO | WO 2005/108829 | 11/2005 |
| WO | WO 2006/098795 | 9/2006 |
| WO | WO 2006/136256 | 12/2006 |
| WO | WO 2007/059051 | 5/2007 |
| WO | WO 2007/124311 | 11/2007 |
| WO | WO 2007/124438 | 11/2007 |
| WO | WO 2008/088534 | 7/2008 |
| WO | WO 2008/094247 | 8/2008 |
| WO | WO 2008/094651 | 8/2008 |
| WO | WO 2008/118402 | 10/2008 |
| WO | WO 2009/075858 | 6/2009 |

OTHER PUBLICATIONS

Dallmer Manutronic brochure, "The First Electronic mixer-taps that your hands can orchestrate," Dallmer Handel GmbH, at least as early as Jan. 31, 2008, 12 pgs.

Hego WaterDesign, "Touch Faucets—Amazing Futuristic Faucet Designs," Oct. 6, 2009, 3 pgs.

International Search Report and Written Opinion of the International Searching Authority in counterpart foreign application No. PCT/US2007/025986, issued May 26, 2008, 16 pgs.

KWC AG, Kitchen Faucet 802285 Installation and Service Instructions, dated Jul. 2005, 8 pgs.

Philipp, "Tough Touch Screen," applicanceDESIGN, Feb. 2006.

Quantum Research Group, "E401 User Manual," at least as early as Oct. 22, 2007, 15 pgs.

Quantum Research Group, "Gorenje Puts QSlideTM Technology into Next-Generation Kitchen Hob," Feb. 8, 2006, http://www.qprox.com/news/gorenje.php, 3 pgs.

Quantum Research Group, "QproxTM Capacitive Touch Applications," © 2005, http://www.qprox.com/background/applications.php, 8 pgs.

Quantum Research Group, "QT401 QSlideTM Touch Slider IC," 2004, 16 pgs.

Quantum Research Group, "QT411-ISSG QSlideTM Touch Slider IC," 2004-2005, 12 pgs.

Sequine et al., Cypress Perform, "Application Notes AN2233a," Apr. 14, 2005, 6 pgs.

Sequine et al., Cypress Perform, "Application Notes AN2292," Oct. 31, 2005, 15 pgs.

SLOAN® Optima® i.q. Electronic Hand Washing Faucet, Apr. 2004, 2 pgs.

Symmons® Commercial Faucets: Reliability With a Sense of Style, at least as early as Jan. 4, 2006, 1 pg.

Symmons®, "Ultra-Sense® Battery-Powered, Sensor-Operated Lavatory Faucet S-6080 Series," Oct. 2002, 4 pgs.

Symmons®, "Ultra-Sense® Sensor Faucet with Position-Sensitive Detection," ©2001-2002, 2 pgs.

Symmons®, "Ultra-Sense® Sensor Faucets with Position-Sensitive Detection," Aug. 2004, 4 pgs.

Technical Concepts International, Inc., Capri AutoFaucet® with Surround Sensor™ Technology, 500556, 500576, 500577, Aug. 2004, 1 pg.

Technical Concepts, AutoFaucet® with "Surround Sensor" Technology, Oct. 2005, 4 pgs.

TOTO® Products, "Self-Generating EcoPower System Sensor Faucet, Standard Spout," Specification Sheet, Nov. 2002, 2 pgs.

Various Products (available at least before Apr. 20, 2006), 5 pgs.

Villeroy & Boch "Magic Faucet," at least as early as Nov. 2009, 2 pgs.

Villeroy & Boch web pages, "Magic Basin," 2 pgs., downloaded from http://www.villeroy-boch.com on Dec. 27, 2006.

ZURN® Plumbing Products Group, "AquaSense® Sensor Faucet," Jun. 9, 2004, 2 pgs.

ZURN® Plumbing Products Group, "AquaSense® Z6903 Series", Installation, Operation, Maintenance and Parts Manual, Aug. 2001, 5 pgs.

Dadex Polydex, 2005, 1 pg.

Dadex Polydex—PPR Pipe System for Hot and Cold Water Supply and Distribution, 2005, 2 pgs.

Dow, Plastic Pipes Europe, Middle East & Africa, Hot and Cold Water Pipes, 2007, 1 pg.

Dow, Plastic Pipes Europe, Middle East, & Africa, Dowlex PE-RT, 2007, 2 pgs.

Kerox, Standard Cartridges, 2005, 3 pgs.

Kerox, Ceramic Mixing Cartridge, Conventional Single-Lever Type, Model K-28, 2 pgs., at least as early as May 25, 2007.

Noveon, Inc.; Processing with TempRite® PEX Ensures Quality Piping, www.tempritepex.com/processingInstallation/processing.asp, at least as early as Jun. 7, 2005, 2 pgs.

PEX Association, What is PE-X?, 7 pgs., at least as early as May, 2007.

PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.

SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.

Ticona Engineering Polymers, Engineering Polymers for Innovative Applications catalog, Mar. 2006, 16 pgs.

* cited by examiner

MIXING VALVE INCLUDING A MOLDED WATERWAY ASSEMBLY

CROSS-REFERENCE TO RELATED APPLICATION

This application is a divisional application of U.S. patent application Ser. No. 11/700,598, filed on Jan. 31, 2007, now U.S. Pat. No. 7,806,141, the entire disclosure of which is expressly incorporated by reference herein.

BACKGROUND AND SUMMARY OF THE INVENTION

The present invention relates to fluid delivery devices, and more particularly, to a mixing valve for use with a faucet and including a molded waterway assembly.

Single handle faucets typically include mixing valves that control the flow of both hot and cold water to a delivery spout. These faucets have found wide acceptance and are commonly constructed such that a handle or knob is movable in distinct directions to adjust the temperature (i.e., the mix of hot and cold water) and the flow rate of water.

Conventional mixing valves typically include a machined brass body and associated brass fittings. The brass body usually includes a hot water inlet, a cold water inlet, and a mixed water outlet. An adjustable valve element, typically either a mixing ball or a slidable plate, is manipulated by a handle to control the aforementioned temperature and flow rate of water. In conventional faucets, copper tubes are usually brazed to the inlets and the outlet(s) of the valve body and to associated fittings. Following the brazing operation, an etching or bright dip operation is typically performed to clean the metal surfaces of contaminants.

It may be appreciated that such conventional mixing valves have certain disadvantages. For example, the cost of copper tubing and the additional assembly cost associated with the brazing and bright dipping operations may be significant. The bright dipping operation may also result in the undesirable deposit of metal on the valve body. As such, it is known that the use of plastic materials for waterways may reduce cost, eliminate metal contact, and provide protection against acidic and other aggressive water conditions. The use of non-metallic materials in plumbing fixtures is significant given the growing concern about the quality of potable water. The U.S. Environmental Protection Agency, NSF International (National Sanitary Foundation) and other health-related organizations are actively seeking to reduce the metal content (i.e., copper and lead) in water.

As such, there is a need for a fluid delivery device, such as a mixing valve, which may use a standard brass body while eliminating brazing and bright dipping operations.

According to an illustrative embodiment of the present disclosure, a waterway includes a base having an upper surface and a lower surface, a first inlet opening extending through the upper surface, an outlet opening extending through the upper surface and positioned in spaced relation to the inlet opening, and a first projection surrounding the first inlet opening and extending upwardly from the upper surface.

According to another illustrative embodiment of the present disclosure, a fluid delivery device includes a waterway assembly having a base supported by the holder, a hot water inlet tubular member having a first end fluidly coupled to the base and a second end configured to be fluidly coupled to a hot water supply, a cold water inlet tubular member having a first end fluidly coupled to the base and a second end configured to be fluidly coupled to a cold water supply, and an outlet tubular member having a first end fluidly coupled to the base and a second end. The base includes an upwardly extending first projection in fluid communication with the hot water inlet, and an upwardly extending second projection in fluid communication with the cold water inlet. A valve assembly includes a hot water inlet port receiving the first projection and in fluid communication with the hot water inlet tubular member, a cold water inlet port receiving the second projection and in fluid communication with the cold water tubular member, an outlet port in fluid communication with the outlet tubular member, and a lower surface facing an upper surface of the base. The valve assembly further includes a movable valve member configured to control the flow of water from the hot water inlet port and the cold water inlet port to the outlet port.

According to a further illustrative embodiment of the present disclosure, a fluid delivery device includes a waterway assembly having a first inlet fluid transport component with opposing first and second ends, an outlet fluid transport component with opposing first and second ends, and a base with an upper surface and a lower surface. The base is fluidly coupled to the first end of the first inlet fluid transport component and the first end of the outlet fluid transport component. A channel is formed within the upper surface of the base. A valve assembly includes a first inlet port in fluid communication with the first inlet fluid transport component, an outlet port in fluid communication with the outlet fluid transport component, and a planar lower surface facing the upper surface of the base. The valve assembly includes a movable valve member configured to control the flow of water from the first inlet port to the outlet port. A seal is received within the channel of the base and sealingly engages the planar lower surface of the valve assembly.

According to a further illustrative embodiment of the present disclosure, a fluid delivery device includes a holder formed of an electrically non-conductive material, and a waterway assembly supported by the holder and formed of an electrically non-conductive material. A valve assembly is fluidly coupled to the waterway assembly and includes a valve body formed of an electrically conductive material. An electrical conductor is electrically coupled to the valve body and to a capacitive sensor.

According to another illustrative embodiment of the present disclosure, a fluid delivery device includes a waterway assembly having an outlet tubular member and formed of an electrically non-conductive material. A manual valve assembly is fluidly coupled to the waterway assembly. An actuator driven valve assembly is also fluidly coupled to the waterway assembly. A controller is in electrical communication with the actuator driven valve assembly. A capacitive sensor is in electrical communication with the controller and is configured to detect the touch of a user, wherein the controller controls the actuator driven valve in response to the touch detected by the capacitive sensor.

According to a further illustrative embodiment of the present disclosure, a fluid delivery device includes a valve assembly having a valve body and a bonnet supported by the valve body. The bonnet includes a flange defining a retaining groove. A sleeve is received over the valve assembly and includes a lip defining an opening and configured to be received within the retaining groove. The flange selectively prevents axial removal of the sleeve from the bonnet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
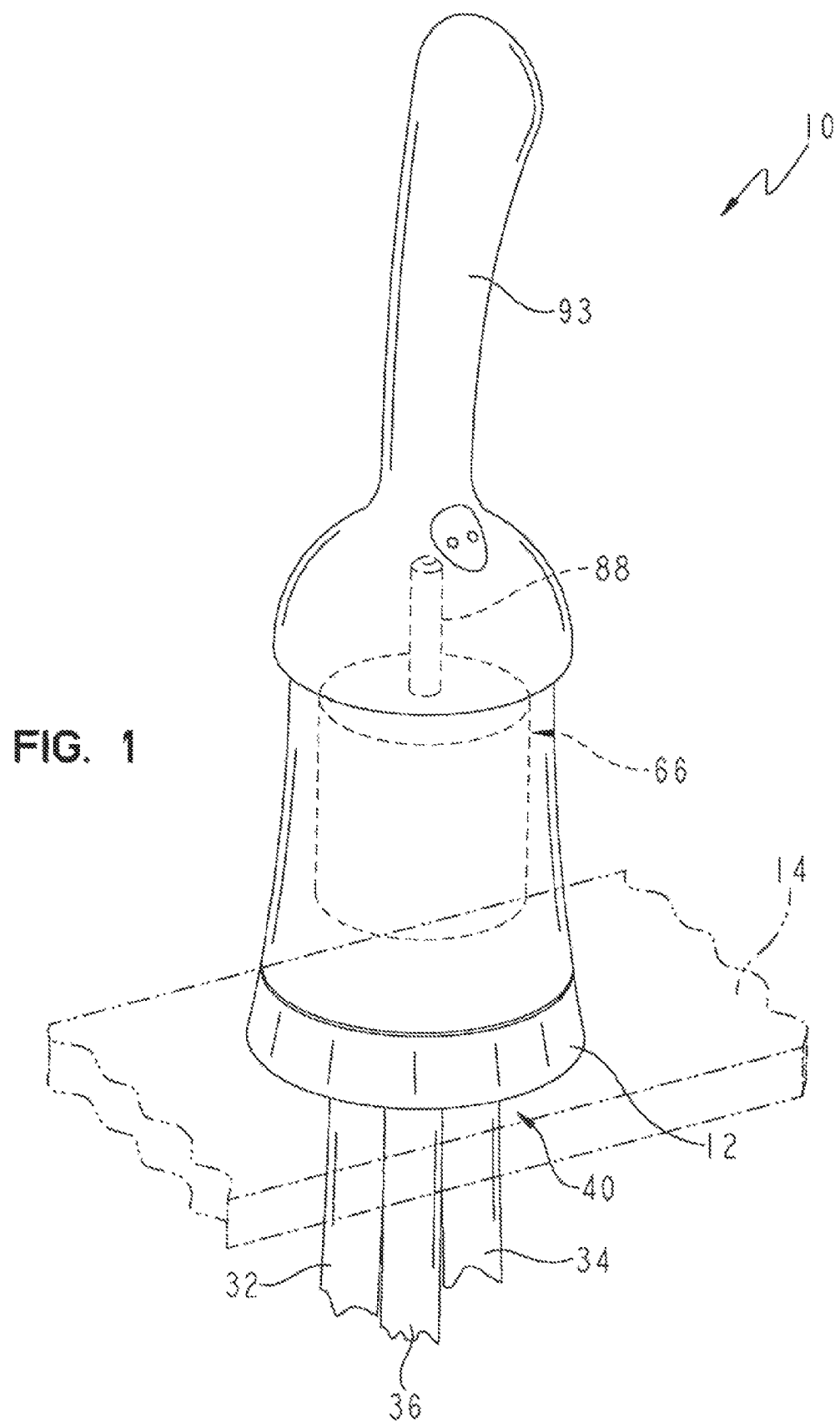
FIG. 1 is a perspective view of the mixing valve of the present disclosure, illustrating the valve body in phantom.
Figure 2:
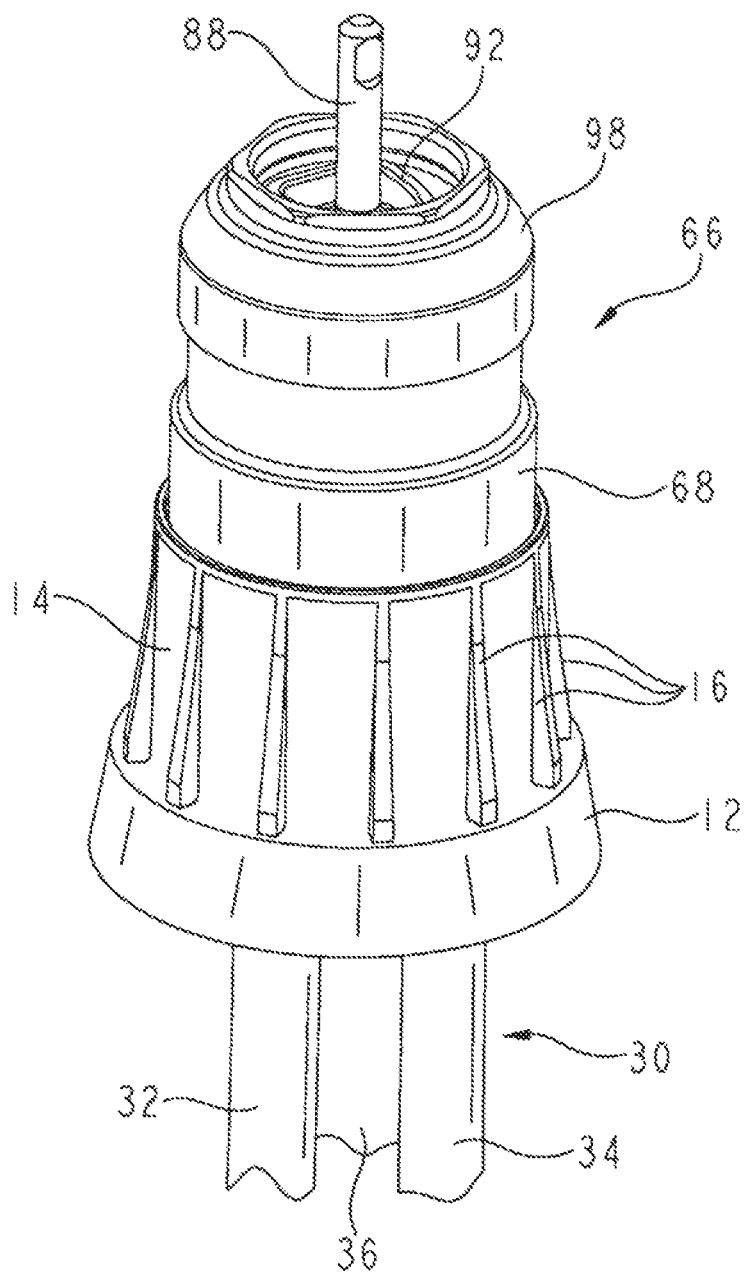
FIG. 2 is a partial perspective view of the mixing valve of FIG. 1, with the handle removed for clarity.
Figure 3:
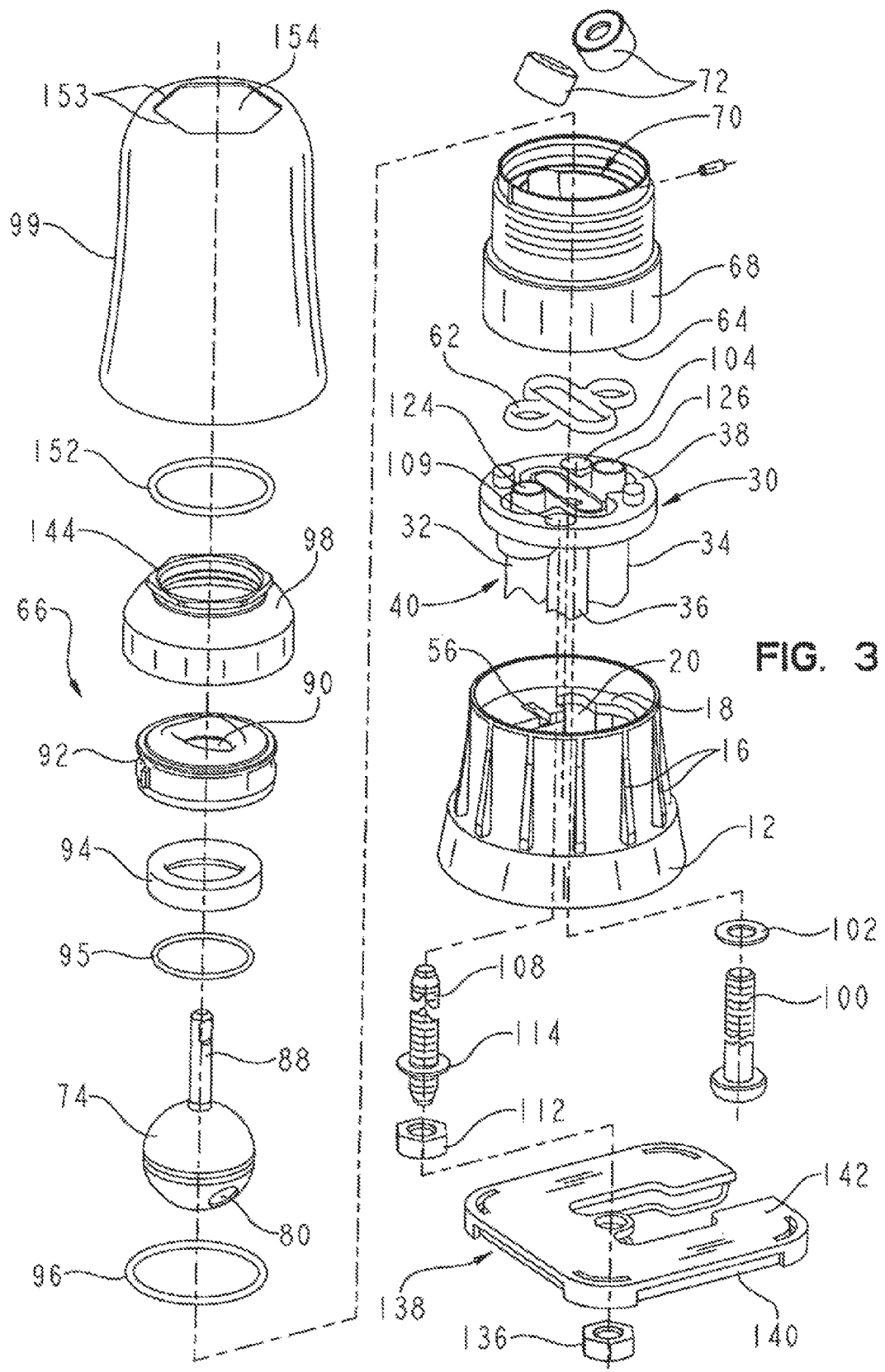
FIG. 3 is a partial exploded perspective view of the mixing valve of FIG. 1.
Figure 4:
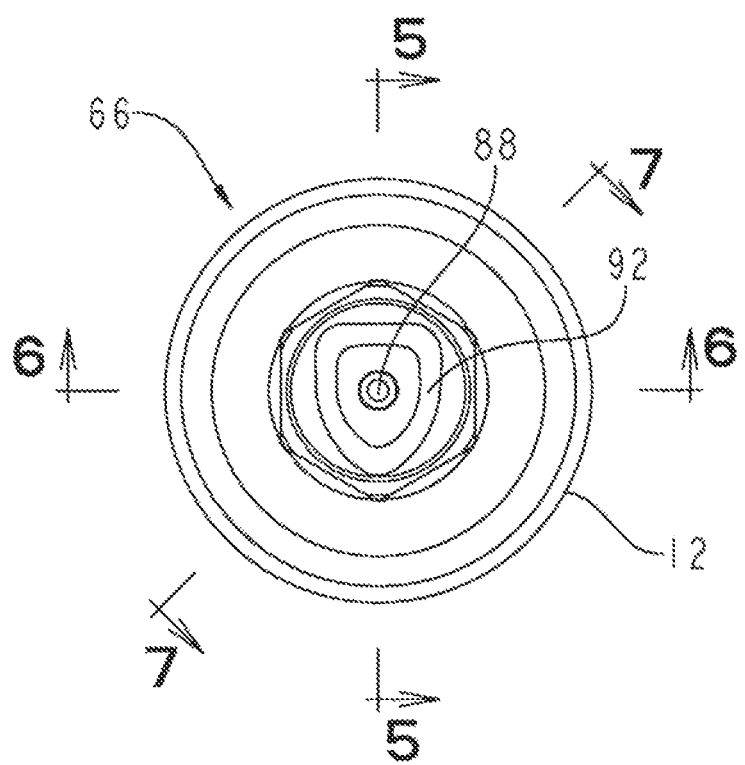
FIG. 4 is a top plan view of the mixing valve of FIG. 2.

Referring initially to FIGS. 1-3, the mixing valve 10 of the present disclosure includes a holder or support base 12 configured to be supported on a sink deck 14 (FIGS. 1 and 7). The support base 12 is illustratively formed of a non-metallic material and in one embodiment is molded from a polymer. As such, the support base 12 is illustratively electrically non-conductive. The support base 12 includes a substantially cylindrical wall 14 having a plurality of circumferentially spaced, radially outwardly extending ribs 16. A platform 18 extends inwardly from the wall 14 and defines an opening 20 (FIG. 3).

A waterway assembly 30 is supported by the platform 18 and includes a first inlet fluid transport component, illustratively a hot water inlet tube 32, a second inlet fluid transport component, illustratively a cold water inlet tube 34, and an outlet fluid transport component, illustratively a tube 36. A puck or disc-shaped base 38 is fluidly coupled to the tubes 32, 34, and 36. The tubes 32, 34, and 36 are illustratively formed of a flexible non-metallic material, such as a polymer. In one illustrative embodiment, the tubes 32, 34, and 36 are formed from a cross-linkable polyethylene. The base 38 is illustratively formed from a non-metallic material compatible to the material of tubes 32, 34, and 36. In the illustrative embodiment, the base 38 is also formed from a cross-linkable polyethylene which is overmolded around the tubes 32, 34, and 36 and subsequently cross-linked, in the manner detailed herein. As used herein, a cross-linkable material illustratively includes thermoplastics and mixtures of thermoplastics and thermosets. It should be noted that the cross-linked polyethylene (PEX) in the base 38 may contain reinforcing elements, such as glass fibers. Additional details regarding the method of overmolding the base 38 are provided in U.S. Pat. No. 7,766,043, the disclosure of which is expressly incorporated by reference herein.

As detailed herein, the tubes 32, 34, 36 and base 38 are illustratively formed of polymer. As such, the waterway assembly 30 is electrically non-conductive. While in one illustrative embodiment, the waterway assembly 30 is formed of a cross-linked polyethylene (PEX), it should be appreciated that other polymers may be substituted therefor. For example, the waterway assembly 30 may be formed of any polyethylene (PE) (such as raised temperature resistant polyethylene (PE-RT)), of polypropylene (PP) (such as polypropylene random (PPR)), or of polybutylene (PB). It is further envisioned that the waterway assembly 30 could be formed of cross-linked polyvinyl chloride (PVCX) using silane free radical initiators, of cross-linked polyurethane, or of cross-linked propylene (XLPP) using peroxide or silane free radical initiators.

With reference to FIGS. 3, 6, 8, and 9, first ends 40 of tubes 32, 34, and 36 are positioned within openings 42, 44, and 46 of the base 38. The openings 42, 44, and 46 are aligned along a center axis 47. Each opening 42, 44, and 46 illustratively includes a counterbore 42a, 44a, and 46a which defines a stop surface 48 and cooperates with the first ends 40 of the tubes 32, 34, and 36. A support or reinforcing boss 50 extends downwardly from the lower surface 52 of the base 38 and surrounds openings 42, 44, and 46. The boss 50 provides additional support to the tubes 32, 34, and 36. Second ends 51 of tubes 32 and 34 are fluidly coupled to hot and cold water sources 53A and 53B, respectively. Similarly, the second end 51 of tube 36 is fluidly coupled to a fluid outlet, illustratively defined by a delivery spout 55 (FIG. 7B).

Registration elements, illustratively ribs 54, extend downwardly from the lower surface 52 of the base 38 and are configured to be received within a cooperating notch 56 formed within the platform 18 of the support base 12, thereby facilitating proper orientation of the waterway assembly 30 relative to the support base 12. In a further illustrative embodiment, locking elements, such as resilient tabs (not shown) may extend radially inwardly from the wall 14 of the support base 12 for releasably retaining the waterway assembly 30.

A fluid collecting channel or recess 57 is formed within the upper surface 60 of the base 38 and surrounds the outlet opening 46. A channel 58 is formed in the upper surface 60 of the base 38 and is configured to receive a resilient seal, illustratively a silicone gasket 62. The channel 58 surrounds openings 42 and 44 and recess 57. The gasket 62 provides for a water seal between the upper surface 60 of the base 38 and the planar lower surface 64 of a valve assembly 66.

The valve assembly 66 may comprise a conventional design. Illustratively, the valve assembly 66 may be a known ball type mixing valve assembly. Examples of such valve assemblies are disclosed in U.S. Pat. No. 4,838,304 to Knapp, U.S. Pat. No. 5,615,709 to Knapp, U.S. Pat. No. 5,927,333 to Grassberger, and U.S. Pat. No. 6,920,899 to Haenlein et al., the disclosures of which are all incorporated by reference herein.

Figure 5:
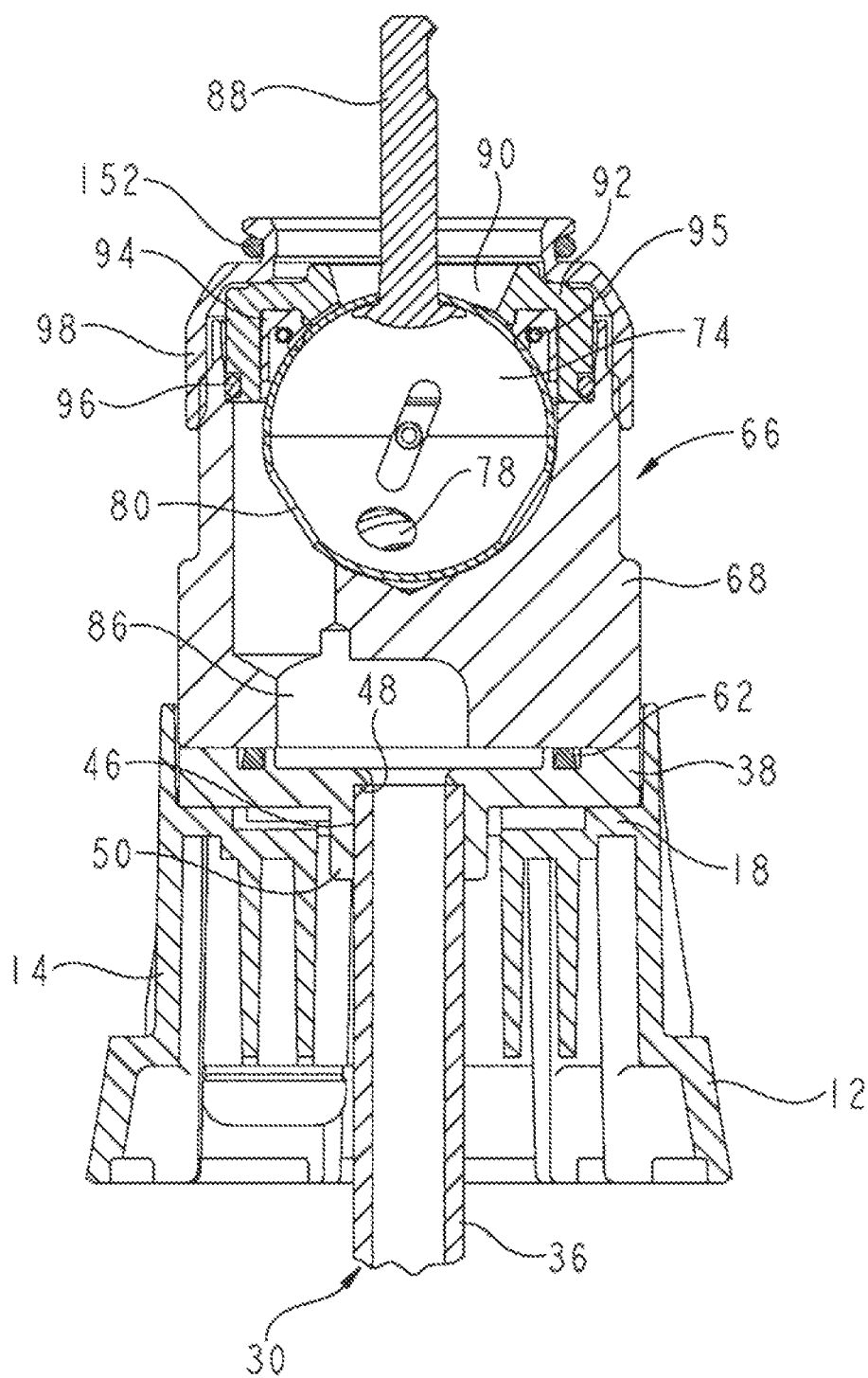
FIG. 5 is a cross-sectional view taken along line 5-5 of FIG. 4.
Figure 6:
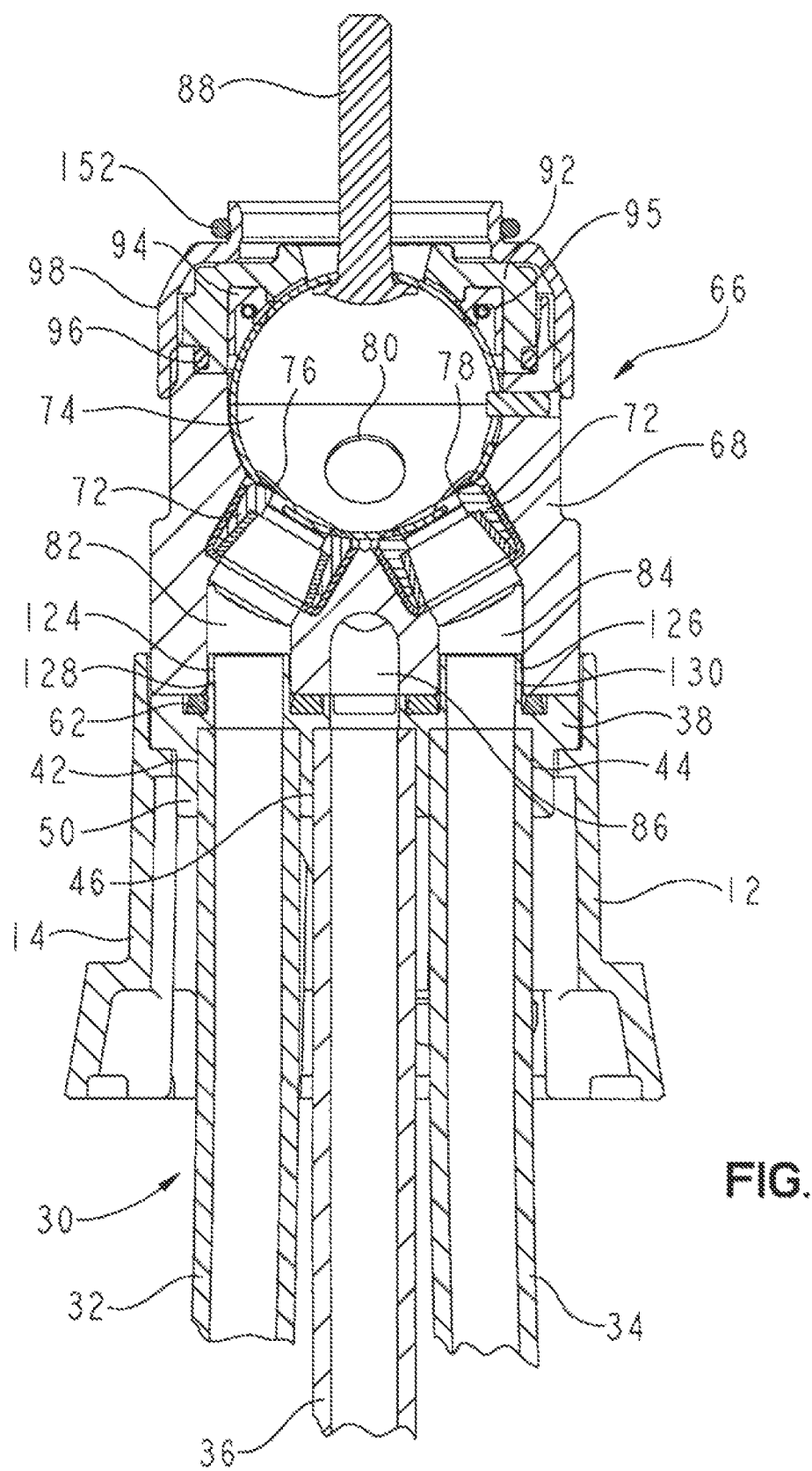
FIG. 6 is a cross-sectional view taken along line 6-6 of FIG. 4.

With reference to FIGS. 1, 5, and 6, the valve assembly 66 illustratively includes a valve body 68 defining a chamber 70. The valve body 68 is illustratively formed from an electrically conductive material, such as brass. A pair of seats 72 are supported within the valve body and are configured to sealingly engage a hollow ball 74, illustratively formed of stainless steel. The ball 74 has a substantially spherical valve surface with hot water inlet openings 76, cold water inlet openings 78, and an outlet opening 80 extending therethrough. Cold water inlet openings 76 cooperate with a cold water inlet port 82, hot water inlet openings 78 cooperate with hot water inlet port 84, and outlet opening 80 cooperates with an outlet port 86 to regulate the passage of water from the inlet ports 82 and 84 to the outlet port 86 by regulating the water mixture ratio and the flow rate. A control stem 88 is connected to the ball 74 and extends through a control opening 90 defined by a cover 92 and is coupled to a handle 93. The control stem 88 and the handle 93 are illustratively formed of an electrically conductive material. A lip seal 94 and an o-ring 95 are received intermediate the cover 92 and the ball 74. Similarly, an o-ring 96 is received intermediate the cover 92 and the valve body 68. A bonnet 98 is threadably received on the valve body 68 for receiving the internal valve components, including ball 74, therein. A sleeve 99 is received over the bonnet 98 as further detailed herein.

The valve body 68 is secured to the support base 12 by a screw 100 and washer 102. The screw 100 passes through an opening 104 formed in the base 38 and is threadably received within a threaded aperture 106 formed in the valve body 68. Similarly, a threaded mounting shaft or shank 108 passes through an opening 109 formed in base 38 and is threadably received within a threaded aperture 110 formed in the valve body 68. A nut 112 and washer 114 are received on the shaft 108 for securing the valve body 68 to the support base 12.

Figure 8:
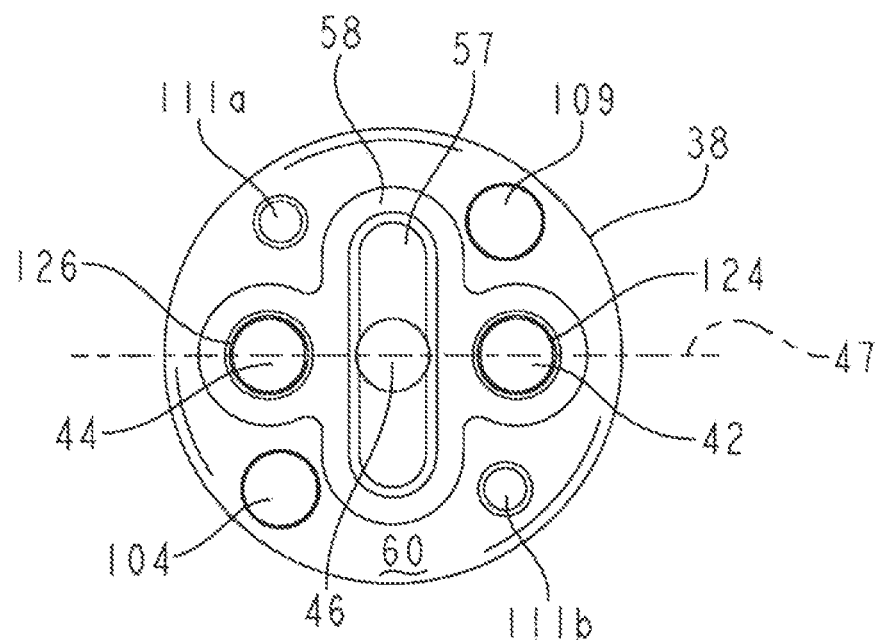
FIG. 8 is a top plan view of the base of the waterway assembly.
Figure 9:
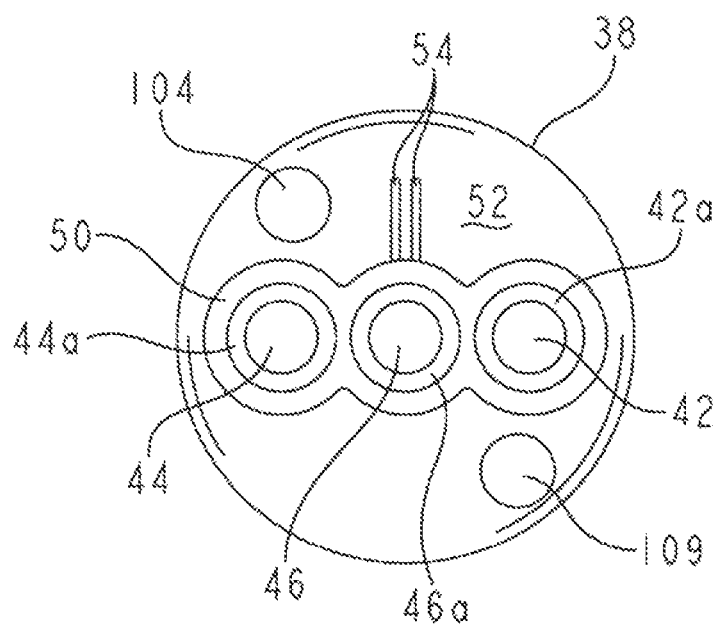
FIG. 9 is a bottom plan view of the base of FIG. 8.
Figure 10:
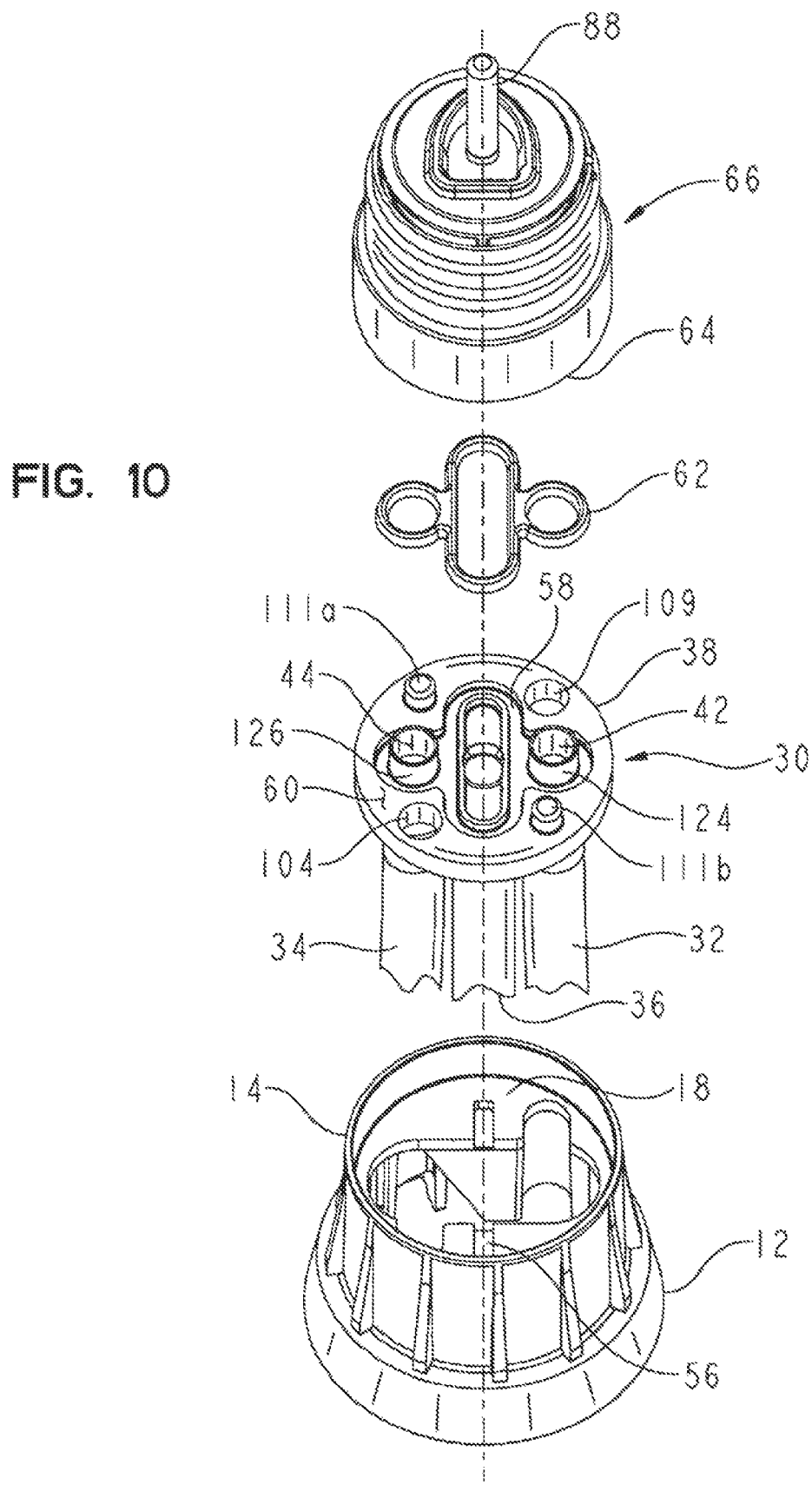
FIG. 10 is an exploded perspective view from the top and rear, showing the valve assembly, the waterway assembly, the seal, and the support base.
Figure 11:
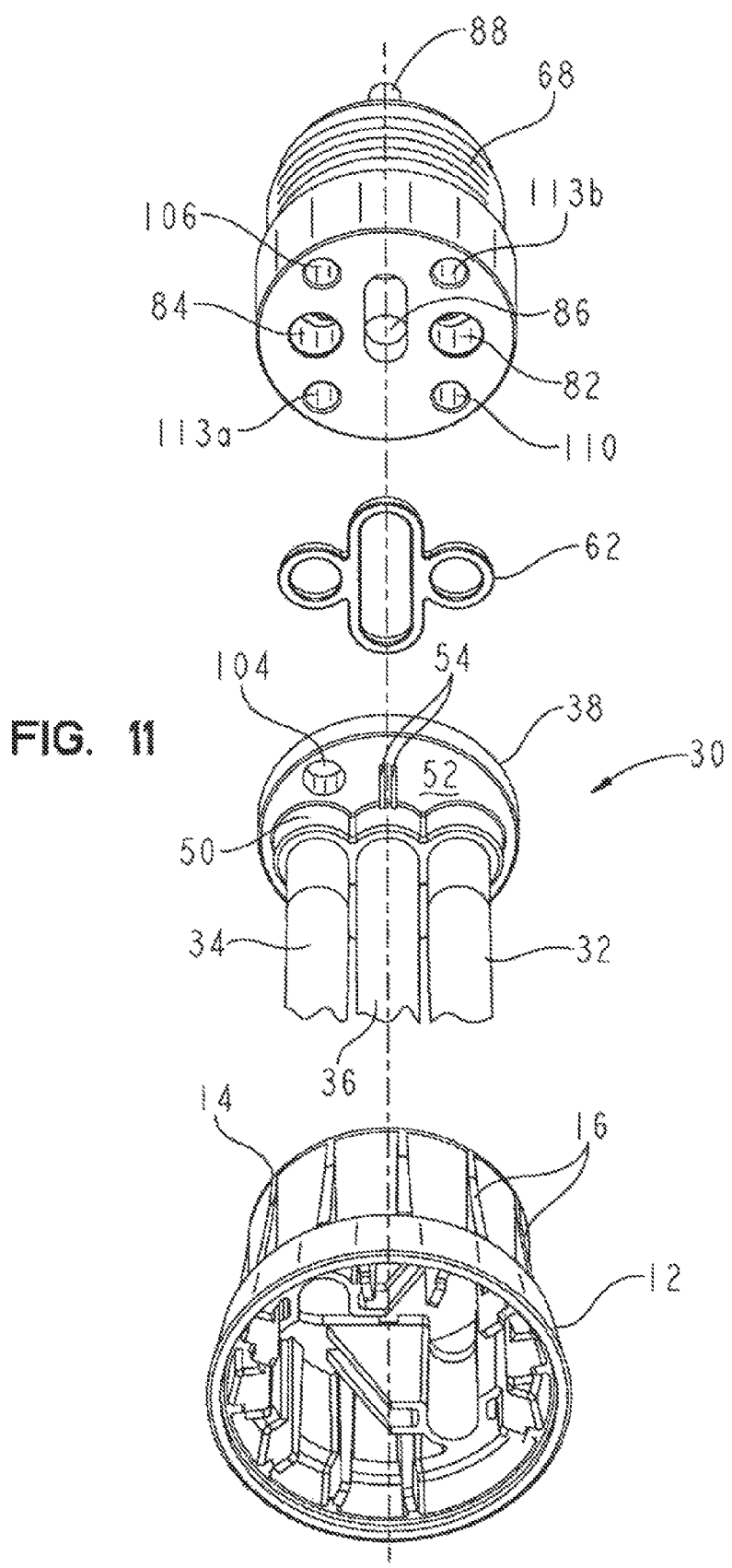
FIG. 11 is an exploded perspective view from the bottom and rear, similar to FIG. 10.

With reference to FIGS. 8 and 10, a pair of locating pegs 111a and 111b extend upwardly from the upper surface 60 of the base 38. The pegs 111a and 111b are configured to be received within cooperating recesses 113a and 113b in the lower surface 64 of valve body 68 to facilitate proper angular orientation of the valve assembly 66 relative to the waterway assembly 30. In a further illustrative embodiment, pegs 111a and 111b may be of different lengths and configured to be received within recesses 113a and 113b with corresponding depths to further facilitate proper orientation. Alternatively, pegs 111a and 111b may be of different cross-sectional shapes and configured to be received within recesses 113a and 113b with cooperating cross-sectional shapes to facilitate proper orientation.

Figure 16:
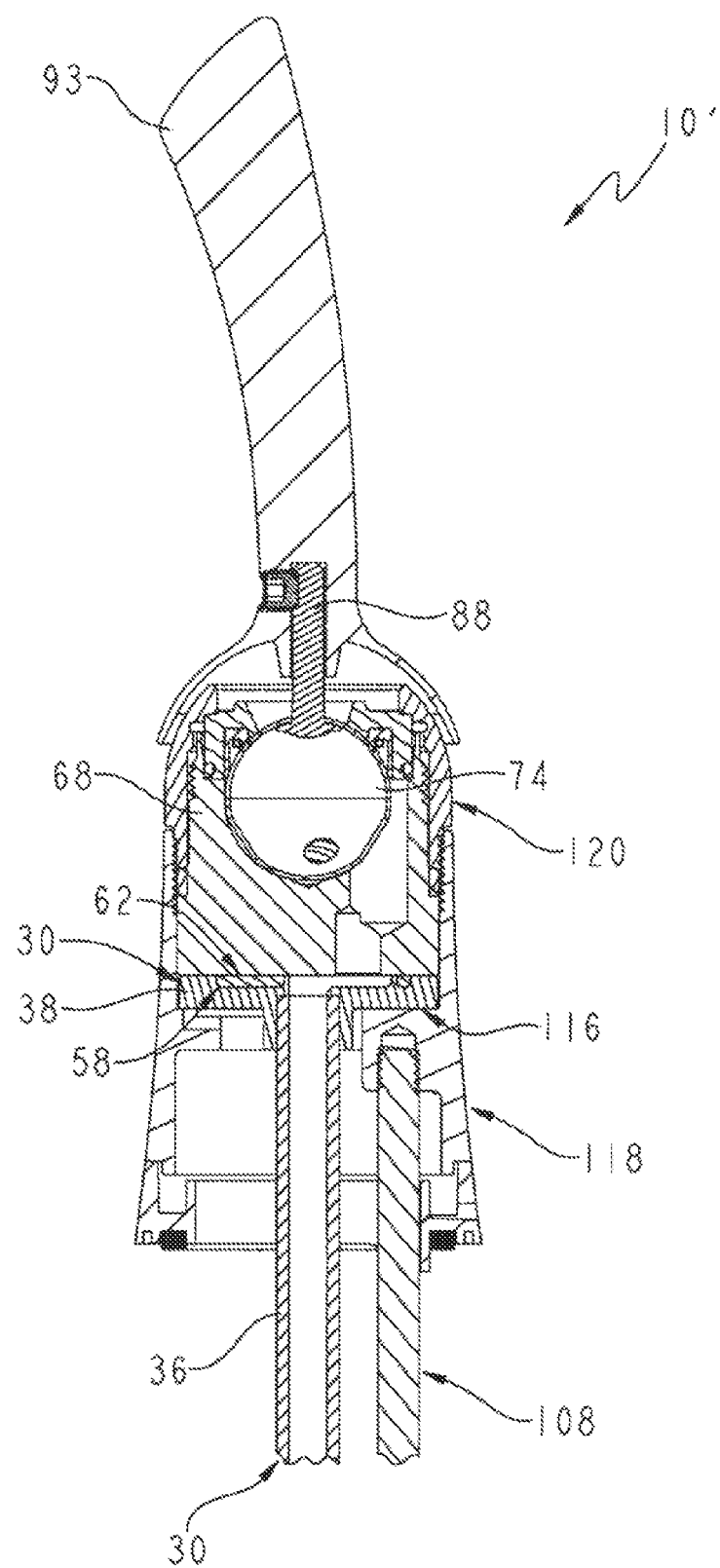
FIG. 16 is a cross-sectional view of a further illustrative embodiment mixing valve.

The screw 100, and the nut 112 on threaded shaft 108, generate compression forces between the valve body 68 and the waterway assembly 30 for compressing the gasket 62 to effect a seal. More particularly, the gasket 62 is compressed between the channel 58 of the base 38 and the lower planar surface 64 of the valve body 68. This compression force may be accomplished in a number of other ways. As shown in the alternative embodiment mixing valve 10' of FIG. 16, the base 38 of the waterway assembly 30 may rest on a ledge 116 formed on a sleeve 118. The valve body 68 rests on top of the base 38. A bonnet 120 threads into the sleeve 118 which compresses the body 68 and waterway assembly 30 together to compress gasket 62 and force a seal. In a further illustrative embodiment, the waterway assembly 30 may have a threads engaging with cooperating threads (not shown) formed on the valve body 68. Additional means to effect sealing between valve body 68 and waterway assembly 30 may be substituted for those detailed above.

In recognition of burst pressure concerns, the illustrative embodiment waterway assembly 30 includes cylindrical projections or sleeves 124 and 126 extending upwardly from upper surface 60 of base 38 and surrounding the openings 42 and 44, respectively, as shown in FIGS. 3, 6, and 8. The projections 124 and 126 are illustratively integrally molded with base 38 and telescope into ports 82 and 84 of the valve body 68, respectively. When the valve assembly is pressurized, the body 66 accepts the load from the thin walls 128 and 130 of the projections 124 and 126 (FIG. 6), thereby preventing extraneous forces from being applied to the corresponding gasket 62 and creating a leak.

The mounting shaft 108 is illustratively formed of an electrically conductive material, such as aluminum. The shaft 108 illustratively extends through the base 38 of the waterway assembly 30 and into the valve body 68. A capacitor sensor 131 is in electrical communication with a controller 132 (FIG. 7), and may be electrically connected to the shaft 108 under the sink deck 14 through a connector, such as a conventional electrical clip 134. The capacitive charge illustratively travels up the shaft 108 through the valve body 66, and into the ball 74. Ultimately the charge will transmit to the handle 93. As such, all visible electrically conductive components, including handle 93 and sleeve 99, are illustratively touch sensitive.

Figure 7A:
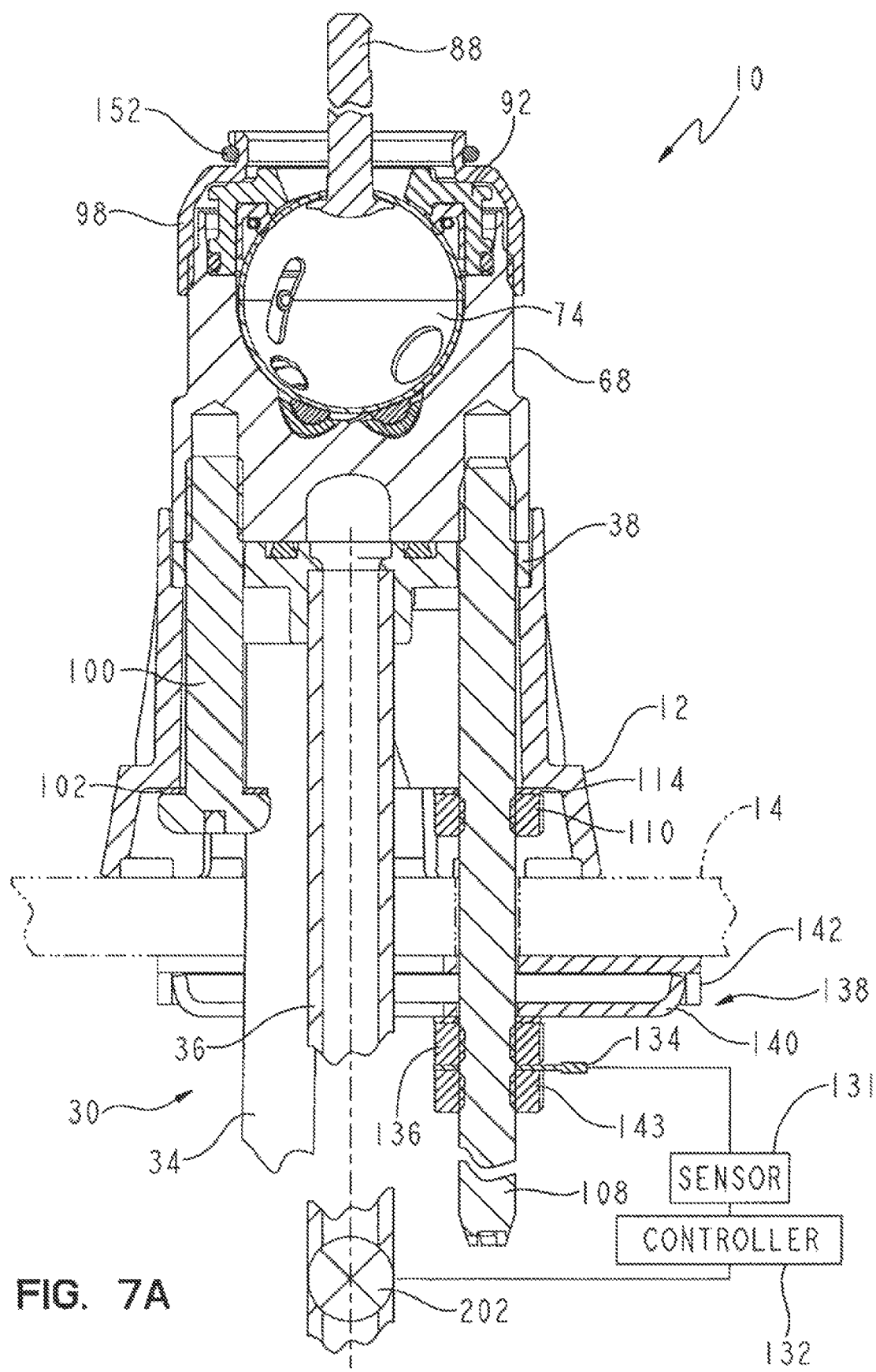
FIG. 7A is a cross-sectional view taken along line 7-7 of FIG. 4, with a capacitive sensor and a controller shown schematically.
Figure 7B:
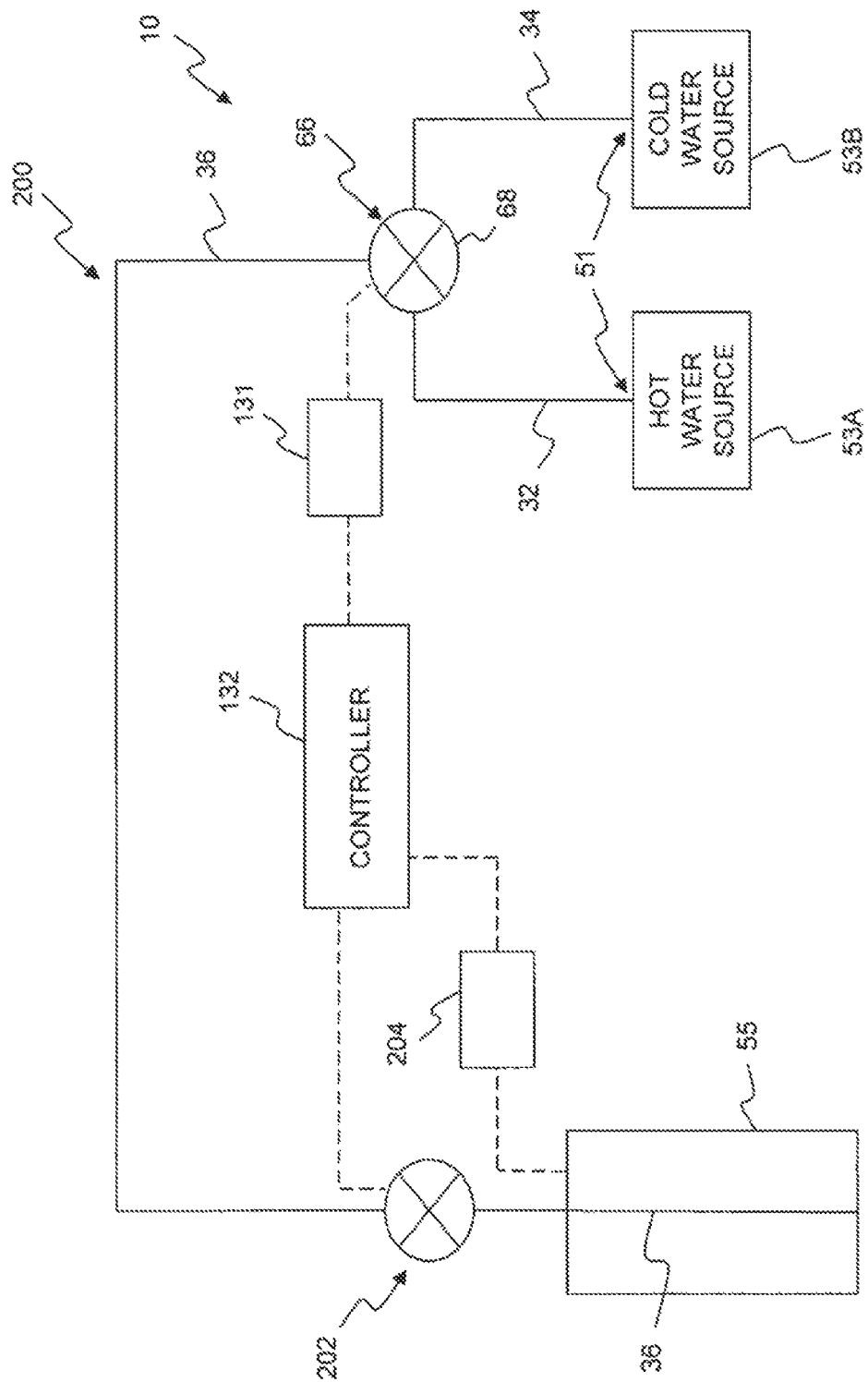
FIG. 7B is a block diagram showing an illustrative electronic faucet system incorporating the mixing valve of FIG. 7A.

As shown in FIGS. 3 and 7A, the base 12 is secured to the sink deck 14 by a nut 136 threadably received on the shaft 108 and cooperating with a mounting bracket 138. The mounting bracket 138 includes a metal support portion 140 and a thermoplastic insulating portion 142 for electrically insulating the shaft 108 from the sink deck 14. As may be appreciated, the valve assembly 66, the sleeve 99, and the handle 93 are electrically insulated from the sink deck 14 by the non-metallic bracket portion 142. An electrical clip 134 is shown captured on the shaft 108 between nut 136 and nut 143 (FIG. 7A).

Referring now to FIG. 7B, the mixing valve 10 may be incorporated within an electronic faucet system 200. More particularly, upon detecting the touch of a user, the capacitive sensor 131 may cause the controller 132 to control operation of an actuator driven valve 202. The actuator driven valve 202 may comprise a conventional motor or solenoid driven valve. As shown, the actuator driven valve 202 is illustratively positioned in series within the outlet tube 36, downstream from the manual valve assembly 66. It should be appreciated that the actuator driven valve 202 may be positioned in other locations within the electronic faucet system 200. For example, the actuator driven valve 202 may be positioned upstream from the manual valve assembly 66. Further, another capacitive sensor 204 may be provided in electrical communication with an electrical conductive portion of the delivery spout 55.

The electrically non-conductive waterway assembly 30 and, more particularly, the outlet tube 36 assists in electrically isolating the water flowing therethrough from the capacitive sensors 131, 204. In other words, the waterway assembly 30 helps prevent the unintended detection by the capacitive sensors 131, 204 of a user's hands within the water flow passing out of the outlet tube 36.

Additional details of capacitive sensors used within electronic faucet assemblies are provided in U.S. Pat. No. 6,962, 168, U.S. Pat. No. 7,690,395, and U.S. patent application Ser. No. 12/525,324, the disclosures of which are all expressly incorporated by reference herein.

With reference now to FIGS. 3 and 12-15, the sleeve 99 has a decorative outer surface and is configured to substantially conceal the bonnet 98 from view of the ordinary observer. More particularly, the sleeve 99 is configured to eliminate from view the seam or gap between the bonnet 98 and the sleeve 99, common in prior art designs, while also eliminating the need for a finishing surface on the bonnet 98.

The sleeve 99 is illustratively formed from a manufacturing process other than machining. For example, the sleeve 99 may be formed from stamping or hydroforming. The bonnet 98 may be a raw brass component with little or no finishing operations performed on it. The bonnet 98 includes a upper flange 144 defining an undercut or retaining groove 146. Illustratively, the flange 144 has a hexagonal shape with a plurality of flat sides 148 joined at outer connecting points 150. A retaining ring, illustratively a resilient o-ring 152, is received within the grove 146. The sleeve 99 includes an inwardly extending lip 153 defining an opening 154 which is configured to cooperate with the flange 144. Illustratively, the opening 154 has a hexagonal shape slightly larger than that of the flange 144.

Figure 12:
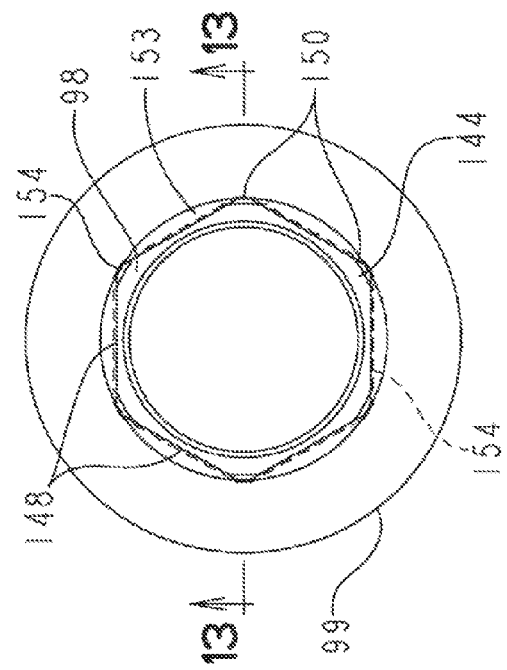
FIG. 12 is a top plan view of the bonnet, the sleeve, and the retaining ring, showing the sleeve in an unlocked position.
Figure 13:
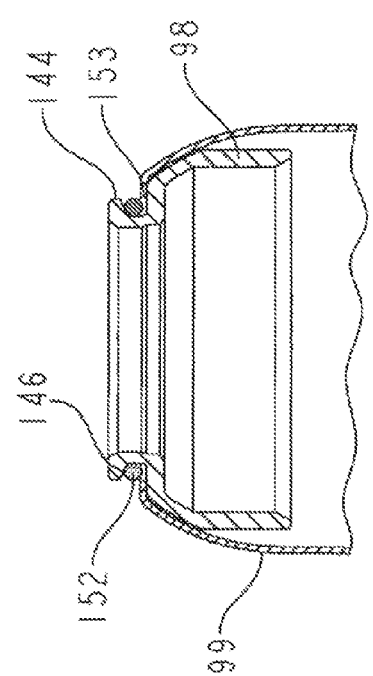
FIG. 13 is a cross-sectional view taken along line 13-13 of FIG. 12.
Figure 14:
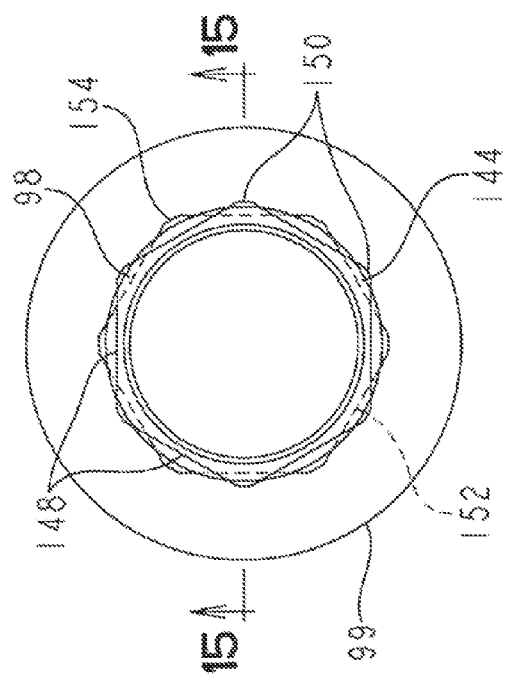
FIG. 14 is a top plan view similar to FIG. 12, showing the sleeve in a locked position.
Figure 15:
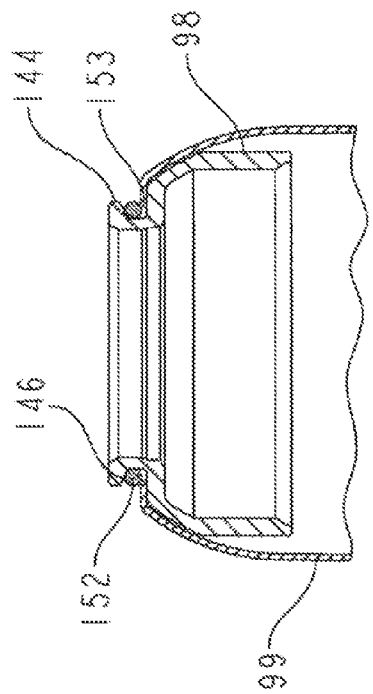
FIG. 15 is a cross-sectional view taken along line 15-15 of FIG. 14.

As shown in FIGS. 12 and 13, in an unlocked position, the hexagonal shaped opening 154 in the upper end of the sleeve 99 is aligned with the flange 144 of the bonnet 98. As such, the sleeve 99 may be moved axially upward and removed from the bonnet 98. FIGS. 14 and 15 illustrate the sleeve 99 rotated by approximately 30 degrees about a longitudinal axis relative to the bonnet 98. As such, six engagement surfaces are defined by the connecting points 150 of the flange 144 to prevent the lip 153 of the sleeve 99 from being axially removed from the bonnet 98. The retaining ring 152 takes up tolerances and prevents rattling of the sleeve 99 relative to the bonnet 98.

Although the invention has been described in detail with reference to certain preferred embodiments, variations and modifications exist within the spirit and scope of the invention as described and defined in the following claims.

The invention claimed is:

1. A fluid delivery device comprising:
a holder formed of an electrically non-conductive material;
a waterway assembly supported by the holder and formed of an electrically non-conductive material;
a valve assembly fluidly coupled to the waterway assembly and including a valve body formed of an electrically conductive material;
an electrical conductor electrically coupled to the valve body; and
a capacitive sensor electrically coupled to the electrical conductor.

2. The fluid delivery device of claim 1, wherein the electrical conductor comprises a fastener coupling the valve assembly to a sink deck.

3. The fluid delivery device of claim 2, wherein the fastener is electrically isolated from the sink deck.

4. The fluid delivery device of claim 1, wherein the waterway assembly comprises a plurality of tubes and a base overmolded around the tubes.

5. The fluid delivery device of claim 4, wherein the plurality of tubes and the base comprise a polymer.

6. The fluid delivery device of claim 5, wherein the plurality of tubes and the base comprise cross-linked polyethylene.

7. The fluid delivery device of claim 1, wherein the holder is formed of a polymer.

8. The fluid delivery device of claim 1, wherein the holder includes a body and a securing member extending downwardly from the body and configured to secure to a sink deck.

9. The fluid delivery device of claim 8, wherein the securing member defines the electrical conductor.

10. The fluid delivery device of claim 1, further comprising:
a sleeve received over the valve assembly and including a lip defining an opening; and
wherein the valve assembly includes a bonnet supported by the valve body, the bonnet including a flange defining a retaining groove configured to receive the lip of the sleeve, the flange selectively preventing axial removal of the sleeve from the bonnet.

11. The fluid delivery device of claim 1, further comprising a delivery spout, wherein the waterway assembly includes a water inlet tube and a water outlet tube, the water outlet tube received within the delivery spout.

12. The fluid delivery device of claim 11, further comprising a spout capacitive sensor, wherein the spout includes an electrically conductive portion in electrical communication with the spout capacitive sensor.

13. The fluid delivery device of claim 12, wherein the water outlet tube is formed of an electrically non-conductive material to assist in electrically isolating water flowing through the outlet tube from the spout capacitive sensor.

14. A fluid delivery device comprising:
a waterway assembly formed of electrically non-conductive material and including a valve interface and a plurality of tubes coupled to the valve interface;
a valve assembly fluidly coupled to the valve interface of the waterway assembly;
an outer housing formed of electrically conductive material and receiving the waterway assembly;
an electrical conductor electrically coupled to the outer housing; and
at least one capacitive sensor electrically coupled to the electrical conductor.

15. The fluid delivery device of claim 14, wherein the valve assembly includes a valve body formed of an electrically conductive material.

16. The fluid delivery device of claim 14, wherein:
the waterway assembly includes a hot water inlet tube, a cold water inlet tube, and an outlet tube; and
the valve assembly includes a mixing valve coupled to the waterway assembly.

17. The fluid delivery device of claim 14, wherein the outer housing receives the waterway assembly and the valve assembly.

18. The fluid delivery device of claim 14, further comprising a delivery spout, wherein the waterway assembly includes a water inlet tube and a water outlet tube, the water outlet tube received within the delivery spout.

19. The fluid delivery device of claim 18, wherein the spout includes an electrically conductive portion in electrical communication with the at least one capacitive sensor, and the water outlet tube is formed of an electrically conductive material to assist in electrically isolating water flowing through the outlet tube from the at least one capacitive sensor.

20. The fluid delivery device of claim 14, further comprising a support base formed of electrically non-conductive material, the support base being coupled to the outer housing and configured to couple to a sink deck.

21. The fluid delivery device of claim 14, wherein the plurality of tubes comprise a polymer.

22. The fluid delivery device of claim 14, wherein the plurality of tubes comprise cross-linked polyethylene.

23. A fluid delivery device comprising:
a delivery spout, including an electrically conductive portion;
a waterway assembly including a water outlet tube formed of electrically non-conductive material and received within the delivery spout;
a capacitive sensor electrically coupled to the delivery spout;
an actuator driven valve assembly in fluid communication with the waterway assembly; and a controller in electrical communication with the capacitive sensor and the actuator driven valve assembly, wherein the controller controls the actuator driven valve in response to input to the capacitive sensor.

24. The fluid delivery device of claim 23, further comprising an outer housing including an electrically conductive portion, the outer housing receiving the waterway assembly, the capacitive sensor electrically coupled to the outer housing.

25. The fluid delivery device of claim 23, further comprising a manual valve assembly fluidly coupled to the waterway assembly wherein the valve assembly includes a valve body and a mixing valve.

26. The fluid delivery device of claim 23, wherein the waterway assembly includes a cold water inlet tube, a hot water inlet tube, and an outlet tube.

27. The fluid delivery device of claim 26, wherein the outlet tube is comprised of electrically non-conductive material, whereby the outlet tube electrically insulates water flowing therethrough from the capacitive sensor.

28. The fluid delivery device of claim 23, wherein the electrically non-conductive material comprising the waterway assembly is a polymer.

29. The fluid delivery device of claim 23, further comprising a support base formed of electrically non-conductive material, the support base being coupled to the outer housing and configured to couple to a sink deck.

30. The fluid delivery device of claim 25, wherein the capacitive sensor is in electrical communication with the manual valve assembly.

31. The fluid delivery device of claim 30, wherein the manual valve assembly includes an electrically conductive handle in electrical communication with the capacitive sensor.

* * * * *